(12) United States Patent
Stanley

(10) Patent No.: US 10,473,317 B2
(45) Date of Patent: Nov. 12, 2019

(54) COOLING A HORTICULTURE LIGHT FIXTURE USING AN ISOLATION CHAMBER

(71) Applicant: HGCI, Inc., Las Vegas, NV (US)

(72) Inventor: John Stanley, Vancouver, WA (US)

(73) Assignee: HGCI, Inc., Las Vegas, NV (US)

( * ) Notice: Subject to any disclaimer, the term of this patent is extended or adjusted under 35 U.S.C. 154(b) by 255 days.

(21) Appl. No.: 14/701,134

(22) Filed: Apr. 30, 2015

(65) Prior Publication Data

US 2015/0252994 A1 Sep. 10, 2015

Related U.S. Application Data

(63) Continuation of application No. 13/533,189, filed on Jun. 26, 2012, now Pat. No. 9,335,038.

(Continued)

(51) Int. Cl.
*F21V 29/60* (2015.01)
*F21V 7/00* (2006.01)
(Continued)

(52) U.S. Cl.
CPC .............. *F21V 29/60* (2015.01); *A01G 7/045* (2013.01); *A01G 9/26* (2013.01); *F21S 8/04* (2013.01);
(Continued)

(58) Field of Classification Search
CPC ... A01G 7/045; A01G 9/26; F21S 8/04; F21V 17/107; F21V 29/15; F21V 29/505;
(Continued)

(56) References Cited

U.S. PATENT DOCUMENTS

D32,722 S 7/1861 Schmidlin
D46,253 S 8/1914 Kopp
(Continued)

FOREIGN PATENT DOCUMENTS

CA 2034710 A1 8/1991
CA 1314529 C 3/1993
(Continued)

OTHER PUBLICATIONS

Air Resistance: Distinguishing Between Laminar and Turbulent Flow, www.docstoc.com, Dec. 29, 2010, p. 1-6.
(Continued)

*Primary Examiner* — Tsion Tumebo
(74) *Attorney, Agent, or Firm* — Ulmer & Berne LLP

(57) ABSTRACT

A vertically disposed HID lamp fixture for growing plants, which includes a housing having an interior, an exterior, a top hole, and a lower lip defining a light opening towards the plants, further including an inlet duct and outlet duct for the forced air cooling embodiment, a socket tower having an upper flange and a lower flange, the upper flange affixed around the perimeter of the top hole securing the socket tower to the housing, a reflector having an aperture, the lower flange affixed around the perimeter of the aperture suspends the reflector within the housing such that an isolation chamber is formed between the exterior side of the reflector and the interior of the housing, a HID lamp removably engages within the socket tower longitudinally extending substantially downward and through the aperture vertically disposed above the light opening sealed by a compressively held glass sheet.

19 Claims, 13 Drawing Sheets

Related U.S. Application Data

(60) Provisional application No. 61/572,646, filed on Jul. 20, 2011.

(51) Int. Cl.

| | | |
|---|---|---|
| *F21V 29/83* | (2015.01) | |
| *F21V 29/505* | (2015.01) | |
| *F21V 29/15* | (2015.01) | |
| *A01G 7/04* | (2006.01) | |
| *F21S 8/04* | (2006.01) | |
| *F21V 17/10* | (2006.01) | |
| *F21V 31/00* | (2006.01) | |
| *F21V 7/04* | (2006.01) | |
| *F21W 131/109* | (2006.01) | |
| *A01G 9/26* | (2006.01) | |
| *F21V 3/00* | (2015.01) | |
| *F21V 7/06* | (2006.01) | |

(52) U.S. Cl.
CPC .............. *F21V 7/00* (2013.01); *F21V 7/0066* (2013.01); *F21V 17/107* (2013.01); *F21V 29/15* (2015.01); *F21V 29/505* (2015.01); *F21V 29/83* (2015.01); *F21V 3/00* (2013.01); *F21V 7/048* (2013.01); *F21V 7/06* (2013.01); *F21V 31/00* (2013.01); *F21W 2131/109* (2013.01); *Y02A 40/274* (2018.01)

(58) Field of Classification Search
CPC .......... F21V 29/60; F21V 29/83; F21V 31/00; F21V 3/00; F21V 7/00; F21V 7/0066; F21V 7/048; F21V 7/06; F21W 2131/109
USPC .................................................. 362/264, 294
See application file for complete search history.

(56) References Cited

U.S. PATENT DOCUMENTS

| | | |
|---|---|---|
| 1,410,945 A | 3/1922 | Mayfield |
| 1,547,026 A | 7/1925 | Canney |
| 1,798,567 A | 3/1931 | Wagenhorst |
| D85,049 S | 9/1931 | Kopp |
| D85,382 S | 10/1931 | Guth |
| 1,848,734 A | 3/1932 | Luce |
| 1,873,310 A | 8/1932 | Doane |
| 1,930,070 A | 10/1933 | Zecher |
| 1,987,705 A | 1/1935 | Pedersen |
| D106,614 S | 10/1937 | Waterbury |
| 2,194,841 A | 3/1940 | Welch |
| D119,800 S | 4/1940 | Carter |
| D123,768 S | 12/1940 | Scribner |
| D125,559 S | 3/1941 | Biller |
| 2,242,590 A | 5/1941 | Marcel |
| D128,049 S | 7/1941 | Kurtz |
| D135,375 S | 3/1943 | Biller |
| 2,339,100 A | 1/1944 | Netting |
| 2,348,617 A | 5/1944 | Furedy |
| D156,014 S | 11/1949 | Lazerson |
| 2,492,946 A | 1/1950 | Barber |
| D174,221 S | 3/1955 | Hatch et al. |
| 2,740,883 A | 4/1956 | Kruger |
| 2,741,694 A | 4/1956 | Wiig |
| 2,998,511 A | 8/1961 | Kingsley Chan |
| 3,025,391 A | 3/1962 | Golko |
| D193,802 S | 10/1962 | Thomsen |
| D195,012 S | 4/1963 | Hoyle |
| 3,125,301 A | 3/1964 | Stotter |
| 3,263,071 A | 7/1966 | Fabbri |
| 3,272,978 A | 9/1966 | Jackson |
| 3,322,946 A | 5/1967 | Cooper |
| 3,420,995 A | 1/1969 | Dunckel |
| D213,391 S | 2/1969 | Bruno |
| 3,433,941 A | 3/1969 | Hall |
| 3,675,008 A | 7/1972 | Hill |
| 3,684,883 A * | 8/1972 | Entwistle .............. F21V 29/004 362/269 |
| 3,701,898 A | 10/1972 | McNamara |
| 3,755,667 A | 8/1973 | Price |
| 3,829,677 A | 8/1974 | DeLlano |
| 3,902,059 A | 8/1975 | McNamara |
| 3,911,265 A | 10/1975 | Landrum |
| 4,028,542 A | 6/1977 | McReynolds, Jr. |
| D245,016 S | 7/1977 | Barr |
| 4,037,096 A | 7/1977 | Brengord |
| 4,078,169 A | 3/1978 | Armstrong |
| 4,175,360 A | 11/1979 | Mulvey |
| 4,229,782 A | 10/1980 | Ruud |
| D259,738 S | 6/1981 | Boschetti |
| 4,308,473 A | 12/1981 | McNamara, Jr. |
| D262,659 S | 1/1982 | Laltta |
| D266,578 S | 10/1982 | Moshier |
| D268,287 S | 3/1983 | Boschetti |
| D270,577 S | 9/1983 | DeVos |
| 4,446,506 A | 5/1984 | Larson |
| 4,531,180 A | 7/1985 | Hernandez |
| 4,616,293 A | 10/1986 | Baliozian |
| 4,669,033 A | 5/1987 | Lee |
| D290,662 S | 7/1987 | Basil |
| D300,877 S | 4/1989 | Cyr |
| 4,855,884 A | 8/1989 | Richardson |
| 4,893,221 A | 1/1990 | Friedman |
| 4,933,821 A | 6/1990 | Anderson |
| 4,939,629 A | 7/1990 | Glanton |
| D311,597 S | 10/1990 | Poot |
| 4,970,428 A | 11/1990 | Hayakawa |
| 4,980,809 A | 12/1990 | Baldwin |
| D316,301 S | 4/1991 | Michael |
| 5,006,752 A * | 4/1991 | Eggink ................. H01J 65/048 313/161 |
| 5,065,294 A | 11/1991 | Poot |
| 5,072,349 A | 12/1991 | Waniga |
| D323,897 S | 2/1992 | Compton |
| 5,088,015 A | 2/1992 | Baggio |
| D329,104 S | 9/1992 | Dieperink |
| D330,438 S | 10/1992 | Herst |
| 5,192,129 A | 3/1993 | Figueroa |
| 5,199,784 A | 4/1993 | Hempleman |
| 5,253,152 A | 10/1993 | Yang |
| D349,358 S | 4/1994 | Herst |
| 5,353,746 A | 10/1994 | Del Rosario |
| D352,126 S | 11/1994 | Ruud et al. |
| 5,440,470 A | 8/1995 | Ly |
| 5,461,554 A | 10/1995 | Leonetti |
| D365,159 S | 12/1995 | Tinen |
| 5,486,737 A | 1/1996 | Hrubowchak |
| 5,510,676 A | 4/1996 | Cottaar |
| D373,000 S | 8/1996 | Brady |
| 5,555,162 A | 9/1996 | Shemitz |
| D374,301 S | 10/1996 | Kleffman |
| D376,437 S | 10/1996 | Karlo |
| 5,568,680 A | 10/1996 | Parker |
| 5,570,947 A | 11/1996 | Felland |
| D377,993 S | 2/1997 | Herst |
| 5,621,267 A | 4/1997 | Shaffner |
| D383,243 S | 9/1997 | Fry |
| 5,698,947 A | 12/1997 | Choi |
| 5,702,179 A | 12/1997 | Sidwell |
| D391,632 S | 3/1998 | Thomas |
| D396,319 S | 7/1998 | Sutton |
| D397,481 S | 8/1998 | Schafer |
| D399,328 S | 10/1998 | Compton |
| D399,329 S | 10/1998 | Compton |
| D399,587 S | 10/1998 | Compton |
| D400,289 S | 10/1998 | Wardenburg |
| 5,816,694 A | 10/1998 | Ideker |
| D401,006 S | 11/1998 | Edwards |
| D405,976 S | 2/1999 | Beall |
| 5,896,004 A | 4/1999 | Feldman |
| 5,924,789 A * | 7/1999 | Thornton ................. F21V 7/09 362/217.05 |
| 5,932,955 A | 8/1999 | Berger |
| 5,938,317 A | 8/1999 | Thornton |

(56) References Cited

U.S. PATENT DOCUMENTS

| | | |
|---|---|---|
| D415,304 S | 10/1999 | Brown |
| 5,983,564 A | 11/1999 | Stragnola |
| 5,987,697 A | 11/1999 | Song |
| 5,999,943 A | 12/1999 | Nori |
| D418,626 S | 1/2000 | Herst |
| D419,248 S | 1/2000 | Lyons |
| 6,024,468 A | 2/2000 | Kassay |
| 6,042,250 A | 3/2000 | Stragnola |
| 6,051,927 A | 4/2000 | Graser |
| 6,053,624 A | 4/2000 | Cronk |
| D425,237 S | 5/2000 | Scott |
| D425,652 S | 5/2000 | Brok |
| D426,010 S | 5/2000 | Compton |
| 6,061,690 A | 5/2000 | Nori |
| 6,065,849 A | 5/2000 | Chen |
| 6,070,173 A | 5/2000 | Huber |
| 6,076,944 A | 6/2000 | Maranon |
| 6,079,851 A | 6/2000 | Altman |
| D428,516 S | 7/2000 | Reo |
| 6,094,919 A | 8/2000 | Bhatia |
| 6,111,739 A | 8/2000 | Wu |
| 6,152,579 A | 11/2000 | Reed et al. |
| D439,008 S | 3/2001 | Kim |
| D440,289 S | 4/2001 | Olson et al. |
| 6,210,025 B1 | 4/2001 | Schmidt |
| 6,230,497 B1 | 5/2001 | Morris |
| D443,198 S | 6/2001 | Snyder |
| D443,949 S | 6/2001 | Dimonte |
| 6,247,830 B1 | 6/2001 | Winnett |
| D445,943 S | 7/2001 | Littman |
| 6,257,735 B1 | 7/2001 | Baar |
| 6,267,483 B1 | 7/2001 | Hembery |
| D447,272 S | 8/2001 | Smith |
| 6,279,012 B1 | 8/2001 | Sexton |
| 6,299,327 B1 | 10/2001 | Camarota |
| D452,559 S | 12/2001 | Schonberger |
| 6,343,984 B1 | 2/2002 | Langdon |
| 6,371,630 B1 | 4/2002 | Linger |
| D456,927 S | 5/2002 | Russello |
| D456,928 S | 5/2002 | Russello |
| D456,938 S | 5/2002 | Wardenburg |
| D457,450 S | 5/2002 | Lamond et al. |
| D459,825 S | 7/2002 | Field |
| 6,488,387 B2 | 12/2002 | Wardenburg |
| D469,564 S | 1/2003 | Brok |
| 6,527,422 B1 | 3/2003 | Hutchison |
| 6,548,948 B1 | 4/2003 | Muessli |
| 6,595,662 B2 | 7/2003 | Wardenburg |
| 6,601,972 B2 | 8/2003 | Sei |
| 6,658,652 B1 | 12/2003 | Alexander |
| 6,679,619 B2 | 1/2004 | Saieva |
| D486,593 S | 2/2004 | Griffin |
| 6,688,759 B1 | 2/2004 | Hadjimichael |
| 6,709,131 B1 | 3/2004 | Herst |
| 6,729,383 B1 | 5/2004 | Cannell |
| 6,783,263 B1 | 8/2004 | Cronk |
| D496,121 S | 9/2004 | Santoro |
| D499,504 S | 12/2004 | Meyer |
| D499,505 S | 12/2004 | Benensohn |
| D504,343 S | 4/2005 | Ek |
| 6,885,134 B2 | 4/2005 | Kurashima |
| 6,908,212 B2 | 6/2005 | Schultz |
| 7,011,424 B1 | 3/2006 | Poulson |
| 7,083,309 B2 | 8/2006 | Chan |
| 7,101,060 B2 * | 9/2006 | Oppenheimer ......... F21V 31/00 362/101 |
| 7,131,753 B1 | 11/2006 | Edwards, Jr. |
| 7,156,539 B2 | 1/2007 | Cronk |
| 7,175,309 B2 | 2/2007 | Craw |
| D542,460 S | 5/2007 | Hargreaves |
| D543,652 S | 5/2007 | Hargreaves |
| D543,654 S | 5/2007 | Hargreaves |
| D543,655 S | 5/2007 | Hargreaves |
| D544,982 S | 5/2007 | Hargreaves |
| 7,213,948 B2 | 5/2007 | Hein |
| D544,136 S | 6/2007 | Hargreaves |
| D544,138 S | 6/2007 | Hargreaves |
| D544,139 S | 6/2007 | Hargreaves |
| D544,626 S | 6/2007 | Hargreaves |
| D544,980 S | 6/2007 | Hargreaves |
| D544,981 S | 6/2007 | Hargreaves |
| D544,983 S | 6/2007 | Hargreaves |
| D544,984 S | 6/2007 | Hargreaves |
| D544,985 S | 6/2007 | Hargreaves |
| D544,987 S | 6/2007 | Hargreaves |
| D544,994 S | 6/2007 | Hargreaves |
| D544,995 S | 6/2007 | Hargreaves |
| D545,460 S | 6/2007 | Mason, II |
| D545,484 S | 6/2007 | Hargreaves |
| D545,485 S | 6/2007 | Hargreaves |
| D545,990 S | 7/2007 | Hargreaves |
| D545,994 S | 7/2007 | Hargreaves |
| D545,996 S | 7/2007 | Hargreaves |
| D549,869 S | 8/2007 | Ward |
| D553,781 S | 10/2007 | Pickard |
| 7,296,914 B1 | 11/2007 | Russello |
| 7,360,927 B2 | 4/2008 | Oka |
| D569,024 S | 5/2008 | Redfern |
| D572,858 S | 7/2008 | Santoro |
| 7,445,363 B2 | 11/2008 | Vanden Eynden |
| 7,524,090 B2 * | 4/2009 | Hargreaves ............ A01G 7/045 362/264 |
| 7,534,011 B2 | 5/2009 | Townsley |
| D595,894 S | 7/2009 | Verfuerth |
| D602,625 S | 10/2009 | Santoro |
| D603,087 S | 10/2009 | Mo et al. |
| 7,617,057 B2 | 11/2009 | May |
| D605,342 S | 12/2009 | Chung |
| D608,490 S | 1/2010 | Chung |
| 7,641,367 B2 * | 1/2010 | Hargreaves ............... A01G 9/26 362/375 |
| 7,654,702 B1 | 2/2010 | Ding |
| D611,183 S | 3/2010 | Duarte |
| D613,900 S | 4/2010 | Hargreaves |
| D614,801 S | 4/2010 | Collins et al. |
| 7,722,228 B2 * | 5/2010 | Broer ...................... A01G 9/26 362/373 |
| D617,028 S | 6/2010 | Verfuerth et al. |
| D620,190 S | 7/2010 | Chung |
| D621,993 S | 8/2010 | Jong |
| 7,771,086 B2 | 8/2010 | Goverde |
| D628,335 S | 11/2010 | Hyland |
| 7,854,534 B2 | 12/2010 | Liu |
| D632,419 S | 2/2011 | Ng |
| D633,247 S | 2/2011 | Kong |
| D633,640 S | 3/2011 | Wauters |
| D634,060 S | 3/2011 | Wardenburg |
| D634,240 S | 3/2011 | Junkeer |
| D634,468 S | 3/2011 | Hargreaves |
| D634,469 S | 3/2011 | Hargreaves |
| D637,162 S | 5/2011 | Bridgman |
| D637,341 S | 5/2011 | Wardenburg |
| D637,752 S | 5/2011 | Mekhtarian |
| D640,404 S | 6/2011 | Chipperfield |
| 7,959,331 B2 | 6/2011 | Ho |
| D641,100 S | 7/2011 | Li |
| 7,972,044 B2 | 7/2011 | Burkhauser |
| D644,185 S | 8/2011 | Hargreaves |
| 7,987,632 B2 | 8/2011 | May |
| 8,018,630 B2 | 9/2011 | Herloski |
| 8,038,318 B2 | 10/2011 | Plunk |
| D648,652 S | 11/2011 | Hawkins |
| D649,685 S | 11/2011 | Trzesniowski |
| D650,515 S | 12/2011 | Bradley et al. |
| D650,935 S | 12/2011 | Beghelli |
| 8,113,696 B2 | 2/2012 | Striebel |
| D655,403 S | 3/2012 | Zakula |
| D657,748 S | 4/2012 | Hargreaves |
| D660,252 S | 5/2012 | Hargreaves |
| D661,370 S | 6/2012 | Imajo |
| D661,833 S | 6/2012 | Imajo |
| 8,209,912 B2 | 7/2012 | Hargreaves et al. |
| 8,215,799 B2 | 7/2012 | Vanden Eynden |
| D667,584 S | 9/2012 | Beghelli |

(56) References Cited

U.S. PATENT DOCUMENTS

| | | |
|---|---|---|
| D668,370 S | 10/2012 | Guercio |
| D671,259 S | 11/2012 | Chen |
| D672,908 S | 12/2012 | Wilcox |
| D672,911 S | 12/2012 | Mayfield, III |
| D673,324 S | 12/2012 | Mayfield |
| 8,334,640 B2 | 12/2012 | Reed |
| D675,369 S | 1/2013 | Michaud |
| 8,348,481 B2 | 1/2013 | Chang |
| D675,772 S | 2/2013 | Tran |
| 8,371,726 B2 | 2/2013 | Collins |
| D678,597 S | 3/2013 | Lehman |
| D678,599 S | 3/2013 | Boyer et al. |
| D679,848 S | 4/2013 | Pickard |
| D683,064 S | 5/2013 | Tuck |
| D683,376 S | 5/2013 | Yokoi |
| 8,505,224 B2 | 8/2013 | Huang |
| D689,238 S | 9/2013 | Halsey |
| D689,986 S | 9/2013 | Lord |
| 8,523,385 B2 * | 9/2013 | Lu .................. A01G 7/045 362/231 |
| D690,875 S | 10/2013 | McKenzie |
| D693,959 S | 11/2013 | Boyer |
| D697,663 S | 1/2014 | Speier |
| D698,074 S | 1/2014 | Hargreaves |
| D698,075 S | 1/2014 | Klus |
| D698,986 S | 2/2014 | Reynolds |
| D698,987 S | 2/2014 | Stanley |
| D699,386 S | 2/2014 | Park |
| D702,827 S | 4/2014 | Mase |
| 8,702,283 B2 | 4/2014 | Bradley |
| D705,474 S | 5/2014 | Philips |
| D705,974 S | 5/2014 | Blessitt |
| 8,723,086 B2 | 5/2014 | McMahan |
| D707,385 S | 6/2014 | Wardenburg |
| D708,390 S | 7/2014 | Roos |
| D710,528 S | 8/2014 | Wardenburg |
| 8,801,235 B2 * | 8/2014 | Yurich ............ F21S 8/061 362/296.09 |
| D713,953 S | 9/2014 | Jepson |
| D714,988 S | 10/2014 | Park |
| D715,994 S | 10/2014 | Klus |
| D716,995 S | 11/2014 | Zhu |
| D717,487 S | 11/2014 | Guzzini |
| D717,636 S | 11/2014 | Stanley |
| D720,488 S | 12/2014 | Toyohisa |
| D720,505 S | 12/2014 | Kersten |
| 8,905,575 B2 | 12/2014 | Durkee |
| D720,876 S | 1/2015 | Haverfield |
| D721,844 S | 1/2015 | Lay |
| D722,654 S | 2/2015 | Martone |
| D725,820 S | 3/2015 | Hargreaves |
| 8,967,821 B2 | 3/2015 | Pickard |
| D726,359 S | 4/2015 | Grigore |
| 8,998,473 B1 | 4/2015 | Anderson |
| 9,016,892 B1 | 4/2015 | Scribante |
| 9,016,907 B2 | 4/2015 | Stanley |
| D728,848 S | 5/2015 | Reyes |
| D729,435 S | 5/2015 | Arndt |
| D730,556 S | 5/2015 | Toyohisa |
| D725,819 S | 6/2015 | Reynolds |
| D731,103 S | 6/2015 | Wilke |
| D731,109 S | 6/2015 | Wardenburg |
| D731,701 S | 6/2015 | Hargreaves |
| D732,233 S | 6/2015 | Reynolds |
| D732,234 S | 6/2015 | Rashidi Doust |
| D732,235 S | 6/2015 | Reynolds |
| D732,236 S | 6/2015 | Reynolds |
| D733,347 S | 6/2015 | Dungan |
| 9,052,075 B2 | 6/2015 | Demuynck |
| D733,952 S | 7/2015 | Lay |
| D733,960 S | 7/2015 | Howe |
| D734,534 S | 7/2015 | Howe |
| D735,391 S | 7/2015 | Blessitt |
| D735,401 S | 7/2015 | Clements |
| D736,450 S | 8/2015 | Reynolds |
| D737,498 S | 8/2015 | Stanley |
| 9,110,209 B2 | 8/2015 | Blessitt |
| D738,031 S | 9/2015 | Martins |
| D739,595 S | 9/2015 | Reynolds |
| 9,127,826 B2 | 9/2015 | Boyer |
| D740,486 S | 10/2015 | Reynolds |
| D740,996 S | 10/2015 | Tragatschnig |
| D745,993 S | 12/2015 | Reynolds |
| D747,029 S | 1/2016 | Reynolds |
| D747,538 S | 1/2016 | Reynolds |
| D747,825 S | 1/2016 | Reynolds |
| D747,849 S | 1/2016 | Reynolds |
| D747,923 S | 1/2016 | Cornu |
| D748,319 S | 1/2016 | Johnson |
| D748,320 S | 1/2016 | Johnson |
| D748,847 S | 1/2016 | Johnson |
| D748,850 S | 1/2016 | Johnson |
| D748,849 S | 2/2016 | Stanley |
| D749,773 S | 2/2016 | Waible |
| D750,312 S | 2/2016 | Reynolds |
| D750,313 S | 2/2016 | Reynolds |
| D750,316 S | 2/2016 | Reynolds |
| 9,255,690 B2 | 2/2016 | Dimitriadis |
| D750,831 S | 3/2016 | Clements |
| D751,244 S | 3/2016 | Reynolds |
| D751,245 S | 3/2016 | Stanley |
| D751,247 S | 3/2016 | Reynolds |
| 9,279,553 B1 | 3/2016 | Scribante et al. |
| D753,654 S | 4/2016 | Eastwood |
| 9,310,037 B2 | 4/2016 | Cercone |
| D756,016 S | 5/2016 | Hargreaves |
| D756,023 S | 5/2016 | Hoffer |
| D756,026 S | 5/2016 | Reynolds |
| D757,323 S | 5/2016 | Reynolds |
| D757,326 S | 5/2016 | Reynolds |
| D757,346 S | 5/2016 | Stanley |
| 9,335,038 B2 | 5/2016 | Stanley |
| 9,366,947 B2 | 6/2016 | Miyata |
| D762,320 S | 7/2016 | Reynolds |
| D765,306 S | 8/2016 | Wardenburg |
| D766,756 S | 9/2016 | Franc |
| 9,451,743 B2 | 9/2016 | Koerner |
| D769,513 S | 10/2016 | Reynolds |
| D769,514 S | 10/2016 | Reynolds |
| D770,079 S * | 10/2016 | Stanley .................. D26/118 |
| D770,082 S | 10/2016 | Reynolds |
| D770,670 S | 11/2016 | Reynolds |
| D770,671 S | 11/2016 | Reynolds |
| D771,301 S | 11/2016 | Stanley |
| D771,304 S | 11/2016 | Goltche |
| D773,107 S | 11/2016 | Stanley |
| D774,234 S | 12/2016 | Plourde |
| D775,406 S | 12/2016 | Hargreaves |
| D775,760 S | 1/2017 | Reynolds |
| 9,551,482 B2 | 1/2017 | Seward et al. |
| D780,985 S | 3/2017 | Stanley |
| D780,986 S | 3/2017 | Reynolds |
| D781,492 S | 3/2017 | Reynolds |
| D783,887 S | 4/2017 | Stanley |
| D783,888 S | 4/2017 | Reynolds |
| D786,477 S | 5/2017 | Lauderdale |
| D786,488 S | 5/2017 | Reynolds |
| D786,489 S | 5/2017 | Stanley |
| D786,490 S | 5/2017 | Stanley |
| D786,491 S | 5/2017 | Reynolds |
| D792,635 S | 7/2017 | Reynolds |
| D793,616 S | 8/2017 | Reynolds |
| D796,727 S | 9/2017 | Reynolds |
| D796,728 S | 9/2017 | Reynolds |
| D797,350 S | 9/2017 | Reynolds |
| D797,353 S | 9/2017 | Stanley |
| 9,750,199 B2 | 9/2017 | Stanely |
| 9,752,766 B2 | 9/2017 | Stanley |
| D802,826 S | 11/2017 | Stanley |
| D802,828 S | 11/2017 | Stanley |
| D802,829 S | 11/2017 | Stanley |
| D802,830 S | 11/2017 | Stanley |
| 2002/0073285 A1 | 6/2002 | Butterworth |
| 2002/0141195 A1 | 10/2002 | Wardenburg |

(56) References Cited

U.S. PATENT DOCUMENTS

| | | |
|---|---|---|
| 2003/0031011 A1 | 2/2003 | Miller |
| 2003/0191783 A1 | 10/2003 | Wolczko |
| 2004/0240214 A1 | 12/2004 | Whitlow |
| 2005/0117333 A1 | 6/2005 | Yoshida |
| 2005/0160481 A1 | 7/2005 | Todd |
| 2005/0233691 A1 | 10/2005 | Horton |
| 2006/0231081 A1 | 10/2006 | Kirakosyan |
| 2006/0232984 A1 | 10/2006 | Schuknecht |
| 2006/0282457 A1 | 12/2006 | Williams |
| 2007/0051321 A1 | 3/2007 | Chang |
| 2007/0070633 A1 | 3/2007 | Eynden |
| 2007/0228993 A1 | 10/2007 | Stuer et al. |
| 2007/0246631 A1 | 10/2007 | Brown |
| 2007/0282806 A1 | 12/2007 | Hoffman |
| 2008/0059799 A1 | 3/2008 | Scarlata |
| 2008/0117617 A1* | 5/2008 | Hargreaves .............. A01G 9/26 362/1 |
| 2008/0130304 A1 | 6/2008 | Rash et al. |
| 2008/0205030 A1* | 8/2008 | Hargreaves ............ A01G 7/045 362/1 |
| 2008/0205071 A1* | 8/2008 | Townsley ................. A01G 9/26 362/373 |
| 2008/0212326 A1 | 9/2008 | Chon |
| 2008/0178957 A1 | 11/2008 | Pickard |
| 2008/0278950 A1 | 11/2008 | Pickard et al. |
| 2009/0166250 A1 | 5/2009 | Hargreaves |
| 2009/0231840 A1 | 9/2009 | Boehme et al. |
| 2009/0262540 A1* | 10/2009 | Hargreaves .............. A01G 9/26 362/362 |
| 2009/0276478 A1 | 11/2009 | Soman |
| 2009/0279303 A1* | 11/2009 | Keen ....................... A01G 9/26 362/285 |
| 2009/0310373 A1 | 12/2009 | Burkhauser |
| 2009/0316404 A1 | 12/2009 | Mo |
| 2009/0323335 A1 | 12/2009 | Yang |
| 2010/0214789 A1 | 8/2010 | Hawkes |
| 2010/0238661 A1 | 9/2010 | Pfund |
| 2010/0277908 A1 | 11/2010 | Hu |
| 2010/0277929 A1 | 11/2010 | Hargreaves |
| 2010/0295468 A1 | 11/2010 | Pedersen et al. |
| 2010/0302768 A1 | 12/2010 | Collins et al. |
| 2011/0169412 A1* | 7/2011 | Yurich .................... F21S 8/061 315/112 |
| 2011/0203096 A1 | 8/2011 | Hargreaves |
| 2011/0259665 A1 | 10/2011 | Morgan |
| 2012/0051041 A1 | 3/2012 | Edmond et al. |
| 2012/0092859 A1 | 4/2012 | Gregoris |
| 2012/0145699 A1* | 6/2012 | McMahan ............ H05B 3/0076 219/533 |
| 2012/0212883 A1 | 8/2012 | Hargreaves |
| 2012/0230035 A1* | 9/2012 | Bradley, Jr. ........... F21V 7/0025 362/294 |
| 2012/0302768 A1 | 11/2012 | Janka et al. |
| 2013/0047732 A1 | 3/2013 | Hessling |
| 2013/0083539 A1 | 4/2013 | Dimitriadis |
| 2013/0155685 A1 | 6/2013 | Stanley |
| 2013/0242573 A1 | 9/2013 | Petrsoki |
| 2013/0250567 A1 | 9/2013 | Edmond |
| 2014/0378283 A1 | 12/2014 | Qiu |
| 2015/0023022 A1 | 1/2015 | Stanley |
| 2015/0098215 A1 | 4/2015 | Torabifard |
| 2015/0252992 A1 | 9/2015 | Stanley |
| 2015/0252993 A1 | 9/2015 | Stanley |
| 2015/0252994 A1 | 9/2015 | Stanley |
| 2015/0260381 A1 | 9/2015 | Verfuerth et al. |
| 2017/0211801 A1 | 7/2017 | Stanley |

FOREIGN PATENT DOCUMENTS

| | | |
|---|---|---|
| EP | 0325003 A1 | 7/1989 |
| EP | 0440274 A1 | 8/1991 |
| WO | 2002063210 A2 | 8/2002 |
| WO | 2003060379 | 7/2003 |
| WO | 2008018000 A1 | 2/2008 |
| WO | 2009096775 A2 | 8/2009 |
| WO | 2011119451 A1 | 9/2011 |
| WO | 2015009333 | 1/2015 |

OTHER PUBLICATIONS

Sun Systems LEC 630 Light Emitting Ceramic Fixture, Spec Sheet for 906217—Sun System LEC 630 120 Volt w/ 3100 K Lamps, www.sunlightsupply.com/shop/bycategory/led-lighting/sun-system-lec-630-light-emitting-ceramic-fixture, online, updated Feb. 9, 2015. Site visited Mar. 30, 2015, p. 1.

Mohri, Mineko, International Preliminary Report on Patentability for PCT/US2014/014959, dated Jan. 19, 2016.

A3V Reflector, Titaness Light Shop, www.titanesslightshop.com/products-page/reflectors/a3v-reflector, online. Site visited Jan. 14, 2015.

G2V Grow Light Reflector, Titaness Light Shop, www.titanesslightshop.com/products-page/reflectors/g2v-grow-light-reflector, online. Site visited Jan. 14, 2015.

Sun Systems LEC 315—Reviews?, rollitup.com forum, published Oct. 23, 2013, online. Visited Nov. 8, 2016. <http://rollitup.org/t/sun-sytems-lec-315-reviews.742794>.

Sun System LEC 315 120v Light Emitting Ceramic Metal Halide Fixture w/ Free Ratchet Light Hangers, Amazon.com, earliest review of Jul. 2, 2014, online. Visited Nov. 8, 2016l <https://www.amazon.com/sun-system-emitting-ceramic-fixture/dp/B00HBCV8TM>.

LEC 315 Watt Grow Light Great Yield Reports!, YouTube.com, published Mar. 31, 2014, online. Visited Nov. 8, 2016. <https://www.youtube.com/watch?v=QqcoW19KnUk>.

Air Cooled Grow Lights, greensteamhydroponics.com, published May 24, 2014, online. Site visited Nov. 16, 2016. <http://web.archive.org/web/20140524103407/http://www.greenstreamhydroponics.com/aircooled-reflector-range-from-greenstream-hydroponics/prod_699.html>.

Apollo Horticulture GLRCTAC 6" Air Cool Tube Grow Light Deluxe Glass Cylinder with Hood Reflector, image post date Oct. 15, 2010, site visted Oct. 3, 2014, (online), <http://www.amazon.com/apollo-horticulture-glrctac-cylinder-reflector/dp/b003qkvv04/ref=pd_sbs_lg_5?ie=utf8&refrid=1y9v9qhh4n5vnctjmftr>.

Apollo Horticulture GLRLS24 6" Air Cooled Hydroponic Grow Light Glass Reflector Hood, image post date Oct. 15, 2010, site visted Oct. 3, 2014, (online), <http://www.amazon.com/apollo-horticulture-GLRLS24-hydroponic-reflector/dp/B00BMVK8HG/ref=cm_cd_ql_qh_dp_i>.

Adjustable Reflector, image post date Apr. 23, 2012, site visited Sep. 23, 2015, http://web.archive.org/web/2012043260757/http://hydroponics-products.en.alibaba.com/product/519225678-213056444/adjustable_reflector_grow_light_hydropnics_greenhouse_horticulture_reflector_hood.html.

Agrotech Magnum Reflector, image post date Feb. 5, 2012, site visited Oct. 31, 2014, www.hydroponics.net/i/136580.

Cree CR22, image post date Apr. 28, 2011, site visited Nov. 15, 2014, http://ledsmagazine.com/content/dam/leds/migrated/objects/news/8/4/19/cree204272011.jpg.

ZR series High Efficacy Troffer, image post date Apr. 13, 2012, site visited Oct. 31, 2014, www.cree.com/lighting/products.

Grow Lights Home Depot: Find many types of grow lights for your plant, published Dec. 22, 2012, online. Site visited Jun. 25, 2014. Http:///besthomedecorfurniture.com/gardening-decor/grow-lights-home-depot-few-things-to-consider-when-buying-grow-lighting-plants-online.html.

LED Grow Light Comparison Test Review, Youtube.com, published Jun. 29, 2012, online. Site visited Jun. 25, 2014. www.youtube.com/watch?v=f-8oy0qbgrs.

Illuminator Pro-Series Hybrid 350W, wordpress.com, published Dec. 22, 2010, online, site visited Jun. 25, 2014. http://growsetup.wordpress.com/category/grow-lights/.

California Lightworks New SolarStorm 440W LED Grow Light with UVB, hydrobuilder.com, online. Site visited May 25, 2014. http://hydrobuilder.com/solarstorm-440w-led-grow-light-with-uvb.html?dzid=strands_CLW-SS-440.

(56) References Cited

OTHER PUBLICATIONS

2013 Sunlight Supply Cataog, Issuuu.com, published Aug. 1, 2013, online. Site visited Feb. 2, 2015. http://issuu.com/sunlightsupply/docs/2013_sunlightproductcatalog/49.

pp. 29 and 54 from 2014-2015 dealer catalog showing and describing Super Sun DE reflector published by Sunlight Supply, Inc. 2014.

Dominator XXXL Non AC Reflector pack of 3 Spec Sheet, GreenTreesHydroponics_com, date available Mar. 12, 2014, online. Site visited Feb. 3, 2015, https://www.hydroponics.net/i/141477.

Low Rider Air-Cooled Reflector—TinEye, image post date Oct. 11, 2012, site visited Oct. 1, 2015, www.tineye.com/search/1b0e187c5ed9e4e9cfb55d0472271385a2c0e88/?pluginver.

OG Air Cooled Parabolic Reflector Only—Make the Most of Your Grow Light, GroWell Hydroponics, http://www.growell.co.uk/og-air-cooled-parabolic-reflector-only.html, pp. 1-2, accessed Aug. 26, 2014.

1000 Wall Galaxy Grow Amp Double Ended Grow Light Packages, image post date Jan 30, 2014, sited visited Jul. 8, 2016, http://www.ehydroponics.com/100-watt-galaxy-grow-amp-double-ended-grow-light-package.html>.

2009-10-watt-light-set—TinEye, image post date May 23, 2012, site visited Jul. 8, 2016, <https://www.tineye.com/search/2de39cf51f7a031139a80ce555e2f30d0abd5216/>.

Square 10 Watt LED Grow Light, image post date Aug. 1, 2011, site visited Jul. 8, 2016, <http://www.dhgate.com/store/product/hydroponic-vegetable-10-watt-led-grow-light/216755031.html>.

Sun System 630 Ceramic Metal Halide 120v Specifications, GrowersHouse.com, update on Sep. 9, 2014, Online. Site visited Feb. 3, 2015. <http://growershouse.com/aitdownloadablefiles/download/aitfile/aitfile_id/583/>.

Growlite HDE 600W-1000W Double Ended Lamp Concealed Vacuum Airflow Technology, Indoor Grow Science, site visited Aug. 3, 2016, <http://www.indoorgrowscience.net/downloads/specs/hde.pdf>.

AplusChoice-Hydroponics, image post date Dec. 2, 2014, site visited Jul. 13, 2017, (online), <https://www.tineye.com/search/6589596c8738288de70accceca20d64855d0f1d2/?sort=crawal_date&order=asc>.

Power 600 wat HPS MH Grow Light Digital Dimm System Indoor Garden Set, image post date 2013, site visited Jul. 13, 2017, (online), <https://bidjapon.com/item_View.aspx?itemId=150928769289>.

* cited by examiner

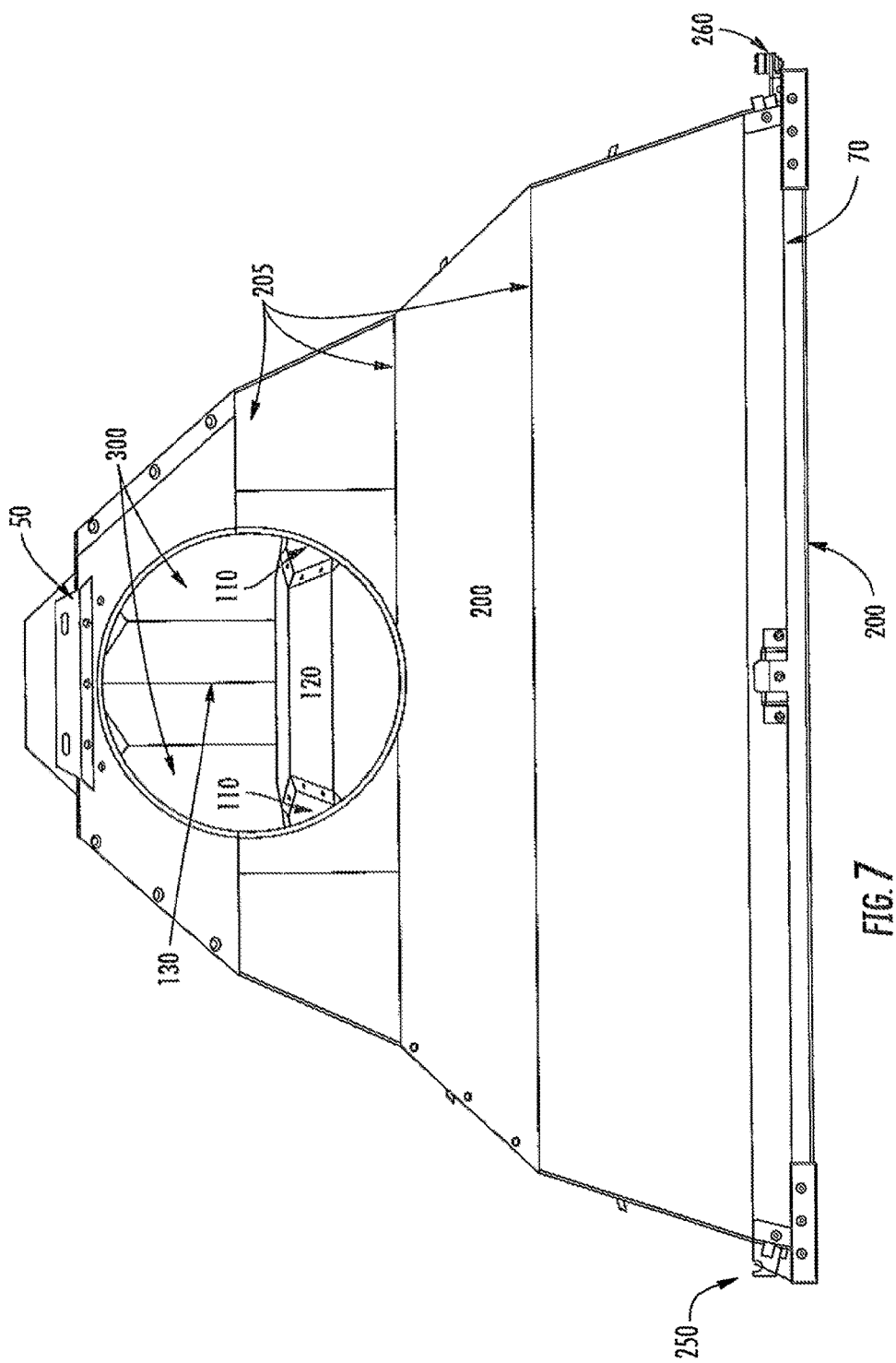

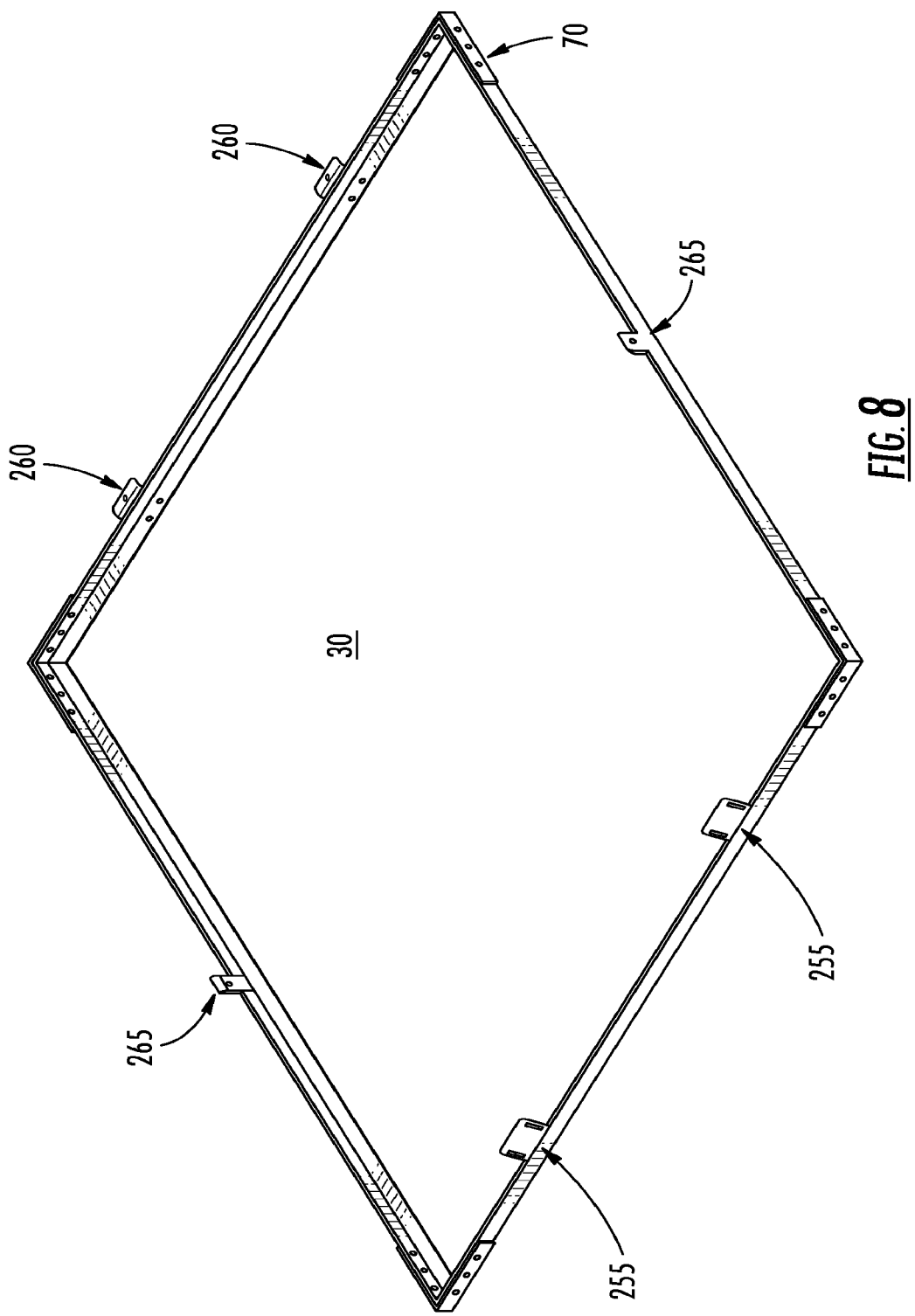

COOLING A HORTICULTURE LIGHT FIXTURE USING AN ISOLATION CHAMBER

CROSS-REFERENCE TO RELATED APPLICATIONS

This application is a continuation of U.S. patent application Ser. No. 13/533,189, filed Jun. 26, 2012, which claims the benefit of U.S. Provisional Patent Application No. 61/572,646, filed Jul. 20, 2011.

TECHNICAL FIELD OF THE INVENTION

The present invention relates in general to horticultural and agricultural lighting systems used in developing and growing plants in controlled environments. More specifically, the present invention relates to a horticulture light fixture having a vertically disposed lamp for growing plants in controlled environments.

SUMMARY OF THE INVENTION

The present invention provides an apparatus for disposing a lamp vertically over plants, whereby a lamp socket is secured within a tower, the tower suspends a 360 degree reflector within a housing, thereby creating a thermal isolation chamber between the external side of the reflector and the internal side of the housing, such that the housing is thermally isolated from the heat energy of the lamp as enclosed by the reflector and glass sheet that defines the lamp chamber.

In the air cooled version, introduction of cooling air through the isolation chamber further reduces the temperature of the housing, and secondarily by convection, cools the external side of the reflector, leaving the lamp and internal side of the reflector sealed away from the cooling air stream as enclosed within the lamp chamber. To facilitating forced air cooling, inlet and outlet ducts provide entry and exit apertures for cooling air communication through the housing, flowing air through the isolation chamber, around the tower, and over the external reflector surface without comingling with the heated air around the lamp within the lamp chamber. The reflector benefits from some conductive cooling, but primarily, the housing is cooled by the cooling air thereby reducing the external temperature of the housing, which in turn reduces heat pollution of the growing environment. The lamp and interior of the reflector are sealed from the growing plant environment, and from the cooling air stream, and because of the vertical disposition of the lamp, meaning the long axis being perpendicular to the ground, the higher operating temperatures at the lamp do not cause drooping, premature failure, explosion, or reduction of economic life.

OBJECTS AND ADVANTAGES

One objective of the invention is to provide a horticulture light system for vertically disposing a lamp over the plants.

A second objective of the invention is to provide conductive cooling of the reflector by forcing cooling air across its outer surface without forcing cooling air within the reflector interior, and without circulating cooling air around the lamp.

A third objective of the invention is to provide a relative low profile system achieved by having the socket end of the lamp inserting through the reflector fixating within the socket external to the reflector chamber.

A fourth objective of the invention is to provide a sealed reflector chamber that cooling air does not pass through and air heated by the lamp within the reflector chamber is not released into the plant growing environment, or exhausted from the fixture.

Another object is to provide quick and easy securing and sealing of the reflector interior and the lamp with a glass sheet in retention frame, the retention frame may be removably engaged from the housing by hinge hooks, each having two prongs such that when cooperatively engaged with a hinge slot, the retention frame may be hung in balance from the housing, or lifted off for complete removal.

Still another objective of the invention is to provide a low drag aerodynamic socket tower.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 7 is an end view from the inlet side of the external housing of FIG. 3, showing the reflector inserted within, having the socket tower centered within the inlet duct;

FIG. 8 is a perspective view of the glass sheet and retention frame;

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

While the present invention has been described in terms of specific embodiments below, it is to be understood that the invention is not limited to the embodiments set forth herein. To improve understanding while increasing clarity, not all of the electrical or mechanical components or elements of the horticulture light fixture were included, and the invention is presented with components and elements most necessary to the understanding of the inventive apparatus and method. The intentionally omitted components or elements may assume any number of known forms from which one of normal skill in the art having knowledge of the information disclosed herein will readily realize.

The term "lamp" as used herein refers to a light source capable of producing electromagnetic energy at wavelength or spectrum conducive to growing plants, a few examples of 'lamps' include high pressure sodium, metal halide, or combinations of both into a single light source.

The term "sealed" as used herein means without air flow communication.

The term "horizontal" refers to the lamp disposition relative to the plant canopy wherein the long axis of the lamp parallels the plant canopy.

The term 'vertical' refers to the lamp disposition relative to the plant canopy wherein the long axis of the lamp is perpendicular to the plant canopy.

The term "air cooled" refers to forced air cooling, with the mechanism of forcing air being a fan that forces air through the fixture. The use of a fan is well known in the prior art, and the particulars of the fan are not discussed herein, any fan capable of pushing air may be used, as one of ordinary skill in the art will immediately realize.

Figure 1:
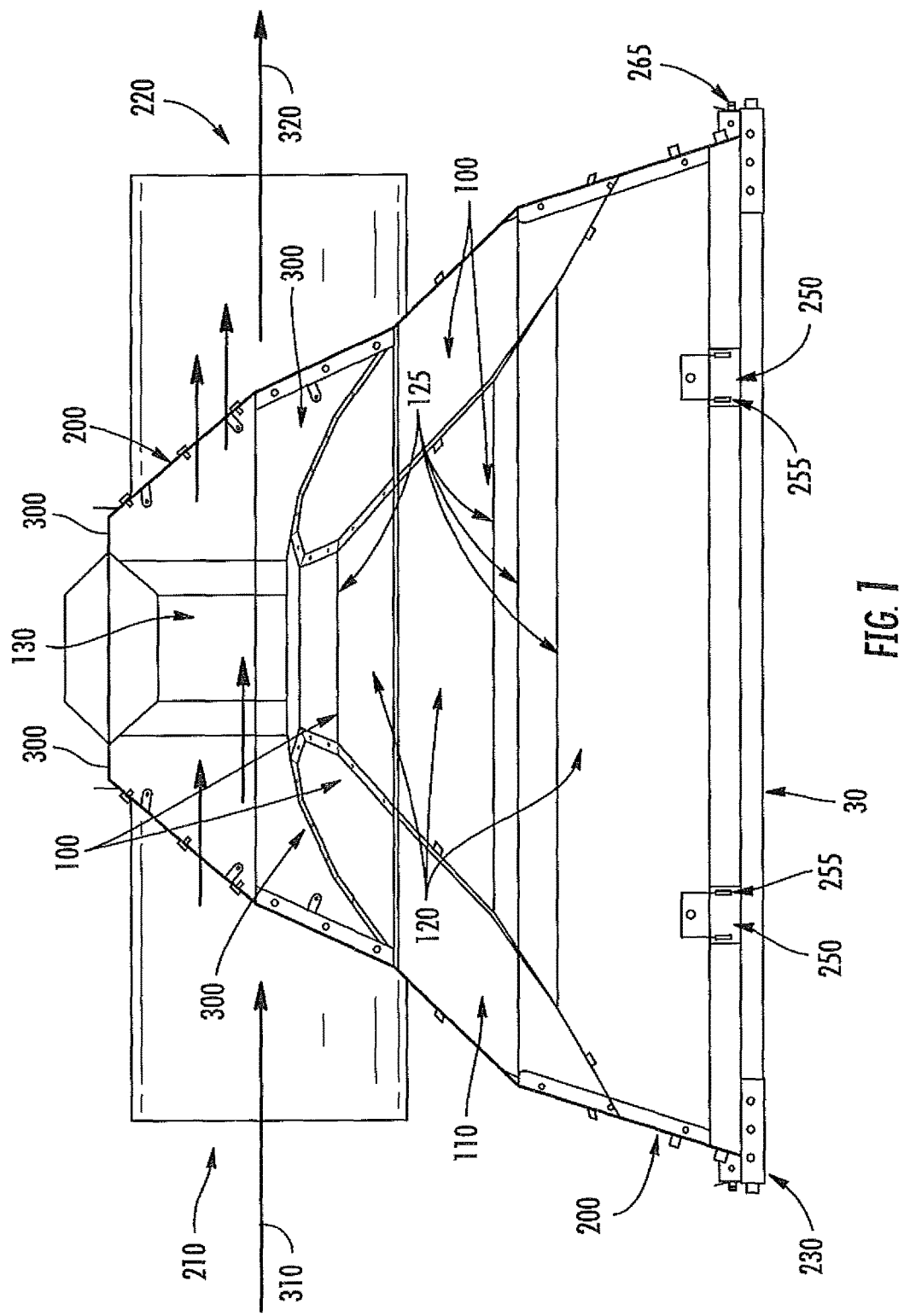
FIG. 1 is a cutaway view of the housing of FIG. 3 showing the inserted reflector of FIG. 2.
Figure 2:
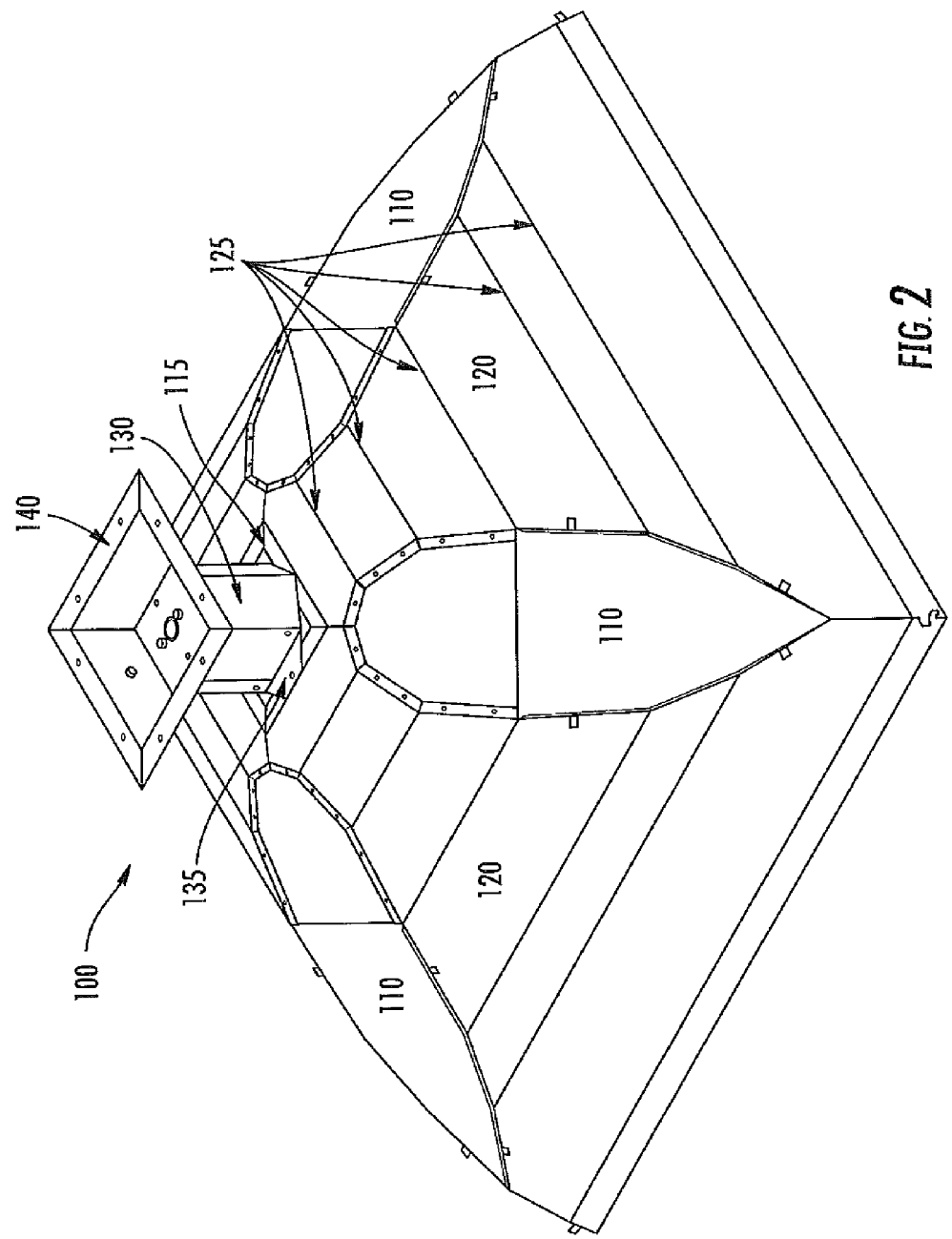
FIG. 2 is a perspective view of the reflector shown in FIG. 1.
Figure 3:
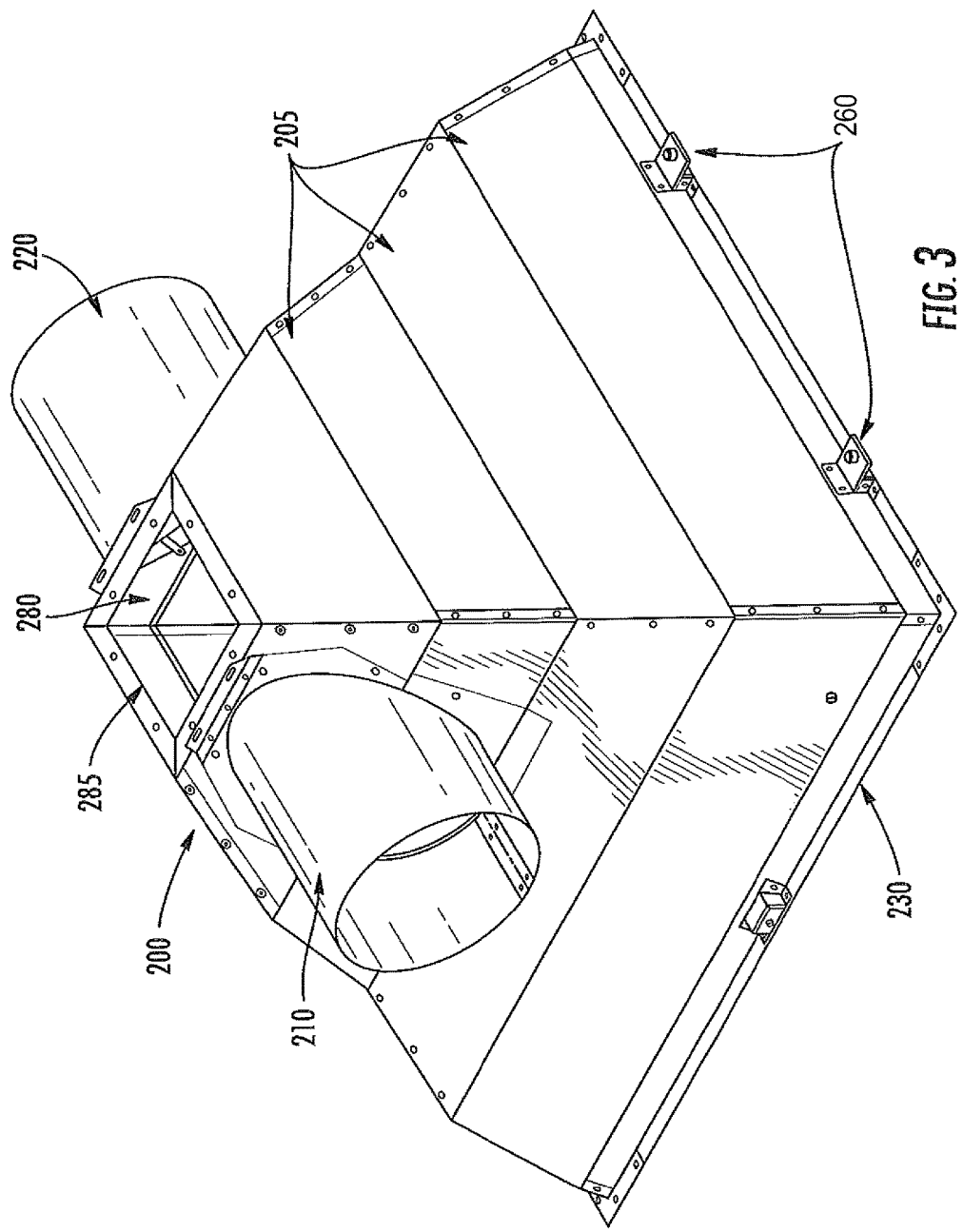
FIG. 3 is a perspective view of the external housing previously shown cutaway in FIG. 1.

The term "convectively cooled" refers to heat transfer in a gas by the circulation of currents from one region to another, specifically the circulation of air currents FIG. 1 is a cutaway view of the housing 200 of FIG. 3 showing the inserted reflector 100 of FIG. 2 as suspended by the socket tower 130 that suspends and fixates the reflector 100 within the housing 200. The housing 200 is of shape and form to receive the reflector 100 and still have a space or void between the reflector 100 and the internal surface of the housing 200 thereby creating an isolation chamber 300. This isolation chamber 300 is sealingly isolated from the interior of the reflector 100, surrounds the exposed tower 130, and is further defined by the interior of the housing 200 that encapsulates the top of the isolation chamber 300. The isolation chamber 300 provides thermal insulation via an air gap between the reflector 100 and the housing 200, thereby reducing temperatures at the housing while reducing the heat pollution caused by a 'hot' housing 200. In the air cooled version as shown in FIG. 1, an inlet duct 210 having cooling air 310 entering and an exhaust duct 220 having heated air 320 exiting provides cooling air communication from a fan or other forced air source through the housing 200 and around the tower 130, but not through the interior reflector 100. The reflector 100 is convectively cooled by cooling air 310 that is forced into the inlet duct 210 crosses over the reflector's 100 outer surface and out the exhaust duct 220, but air does not translate, communicate, or transfer between or out of the interior of the reflector 100.

Figure 9:
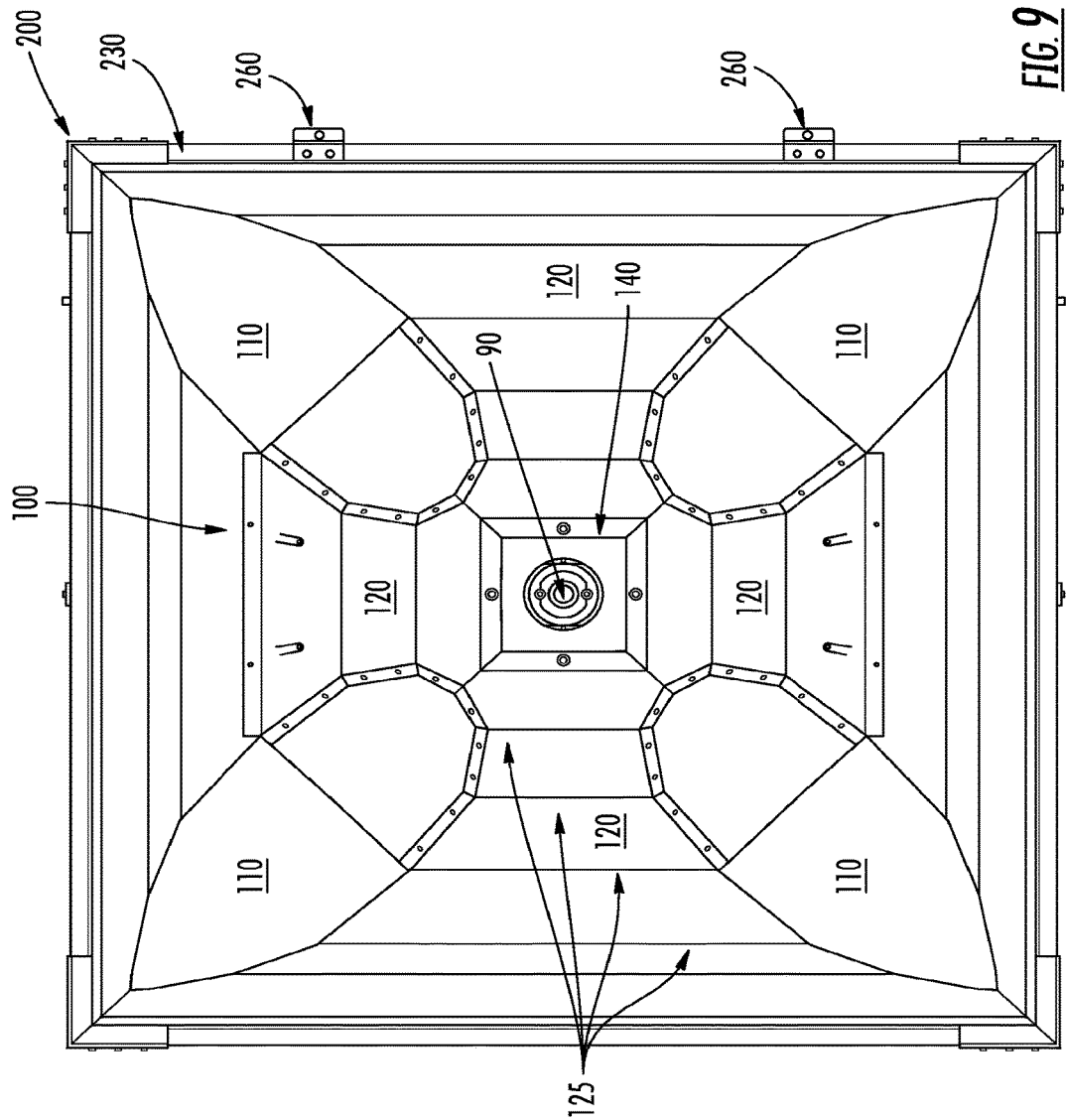
FIG. 9 is a bottom side view of the reflector of FIG. 2 inserted within the external housing of FIG. 3.

The reflector 100 is shown from a perspective angle in FIG. 2 illustrating one possible embodiment, wherein the reflector 100 center sections 120 have a plurality of center section bends 125 mimicking a parabola like form, complimented by reflector corner portions 110 that reduce the angle of reflection at the corners that generally cause hot spots at the plant canopy. Any reflector will work that surrounds the lamp 360 degrees, and one skilled in the art will immediately realize that alterations to the reflector angles or panel proportions will provide trade off benefits of a more 'spot' or 'flood' type of light projection, which are all considered available and anticipated embodiments of the invention. Computer simulation software like Photopia can simulate photometric performance thereby providing assistance in the reflector design to optimize specific applications. The reflector 100 as shown in FIG. 2, 5, and from underneath in FIG. 9 was optimized for the most commonly used lamp, as vertically disposed above the plants at common distances, and represents only one possible embodiment for the reflector 100.

As shown in FIG. 2, the socket tower 130 and reflector 100 are shown in attached combination having a lower flange 135 fixates around and to the aperture perimeter 115 and seals the surface of the lower flange 135 against the surface of the aperture perimeter 115 thereby isolating the interior of the reflector 100 from the exterior.

The preferred air cooled embodiment as shown in FIG. 3 of the housing 200 is formed along a series of fold lines 205 constructively formed to enclose the reflector 100 as shown in FIG. 2, while allowing for a space for the isolation chamber 300 shown in FIG. 1. When assembled, the socket tower 130 passes through the housing 200 at the top hole 280 and suspends the reflector 100 within the housing 200 by the upper tower flange 140 fixating to the perimeter of the top hole 280. Suspending the reflector 100 is critical to reducing temperatures of the housing 200 in that any direct contact of the reflector 100 with the housing 200 promotes conductive heat transfer from the reflector 100 which is relatively hot when compared to the housing 200 during operation, which in turn results in heat pollution from the housing 200 into the growing environment. The top hole 280 provides the mounting surface for the socket tower 130 wherein the tow flange 140 rests and is fixated about the perimeter of the top hole 280.

Figure 4:
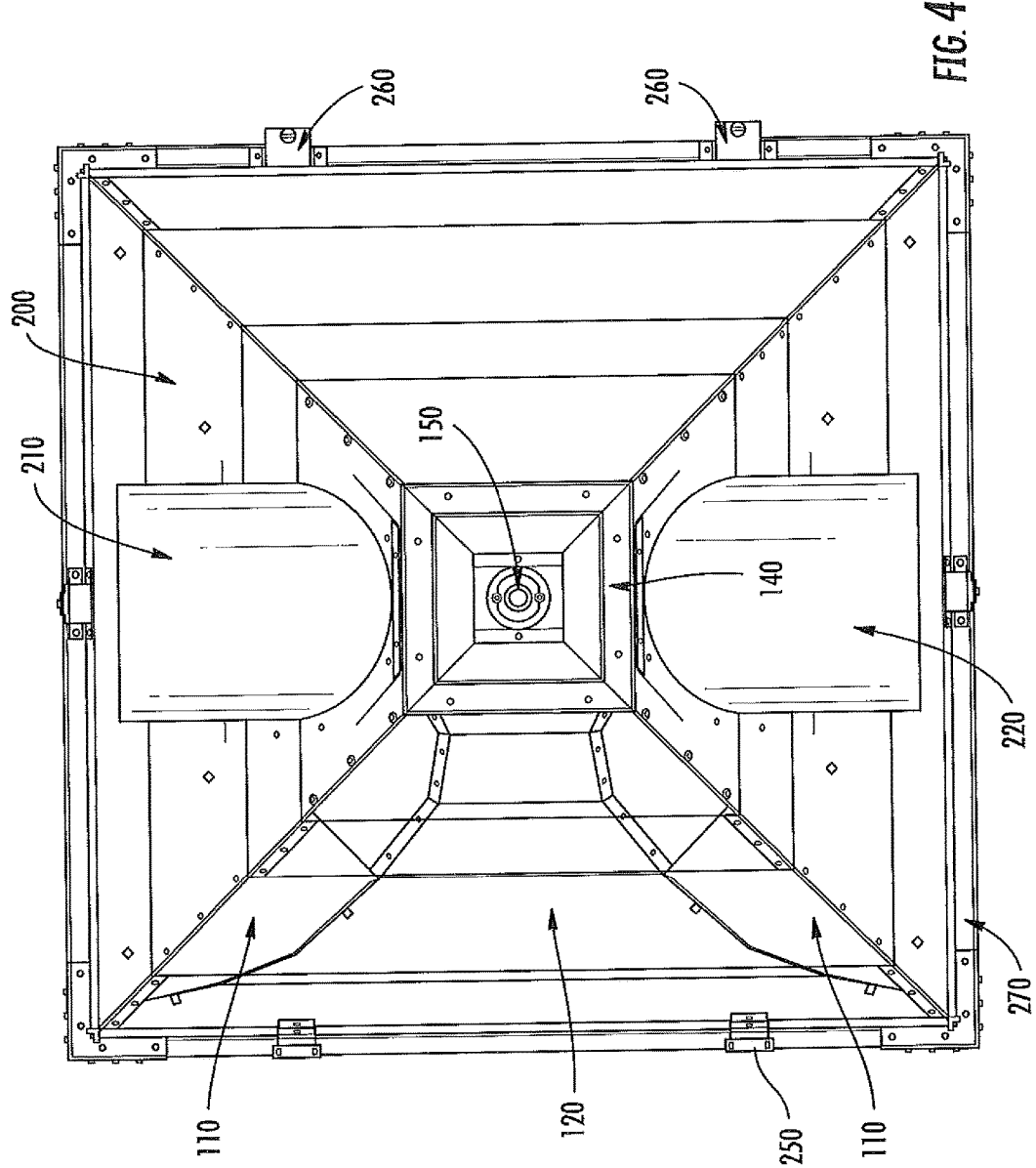
FIG. 4 is a top side cutaway view of the reflector of FIG. 1 inserted within the external housing as shown from the side in FIG. 2.

FIG. 4 is a top down view showing the socket tower 130 located at its attaching location in the housing 200 at the top hole 280, with the power cord hole 150 approximately centered. Having the cord location at the top simplifies the cooling as the cord is out of the way and not in the cooling air stream, is not exposed to heated air, and is not impacted by UV light produced by the lamp 91. The isolation chamber 300 is defined by the housing 200 interior and the reflector 100 exterior as shown in the cutaway portion of FIG. 4, and cooling air 310 flowing over the reflector 100 and within the housing 200 as forced by a fan or other means into the inlet duct 210 through the isolation chamber 300 and out the exhaust duct 220 as heated air 320.

Figure 5:
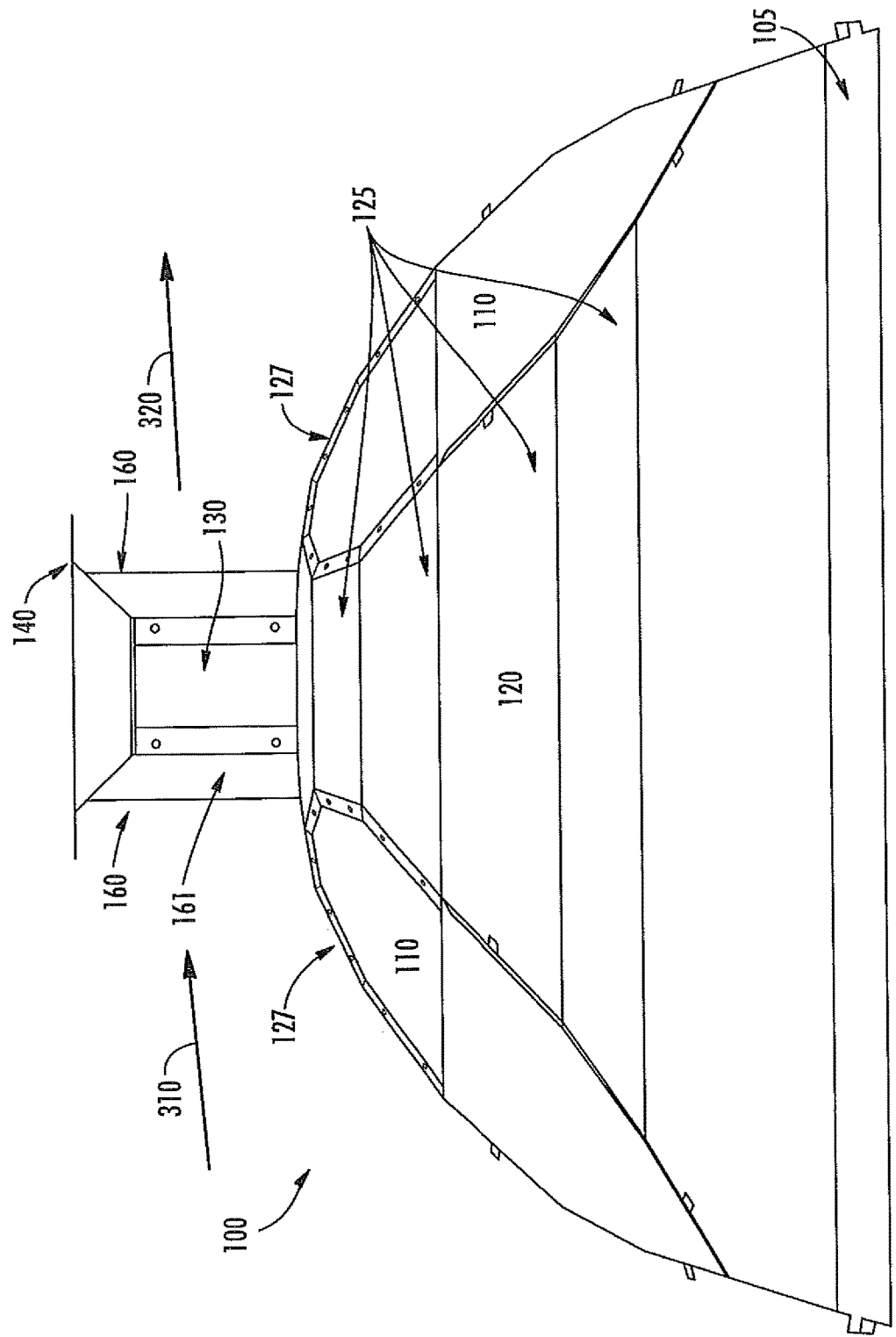
FIG. 5 is a side view of the reflector of FIG. 2.

FIG. 5 shows a side view of the reflector 100 and socket tower 130 attached together as shown perspectively in FIG. 2. The FIG. 5 side view and FIG. 6 front view demonstrates the aerodynamically inspired socket tower 130 having a leading edge 160 complimented with angled surfaces 161, 162 that encourage the cooling air stream 310 to split around the tower 130 thereby channeling air to both sides of the reflector 100 reducing air resistance on the inlet duct 210 side while reducing turbulence on the exhaust duct 220. The reflector 100 itself is constructed using traditional sheet metal forming methods, having a plurality of section bends 125 and reflector corner portions 110 with seams 127 connecting the corner portions 110 with adjacent center sections 120.

Figure 6:
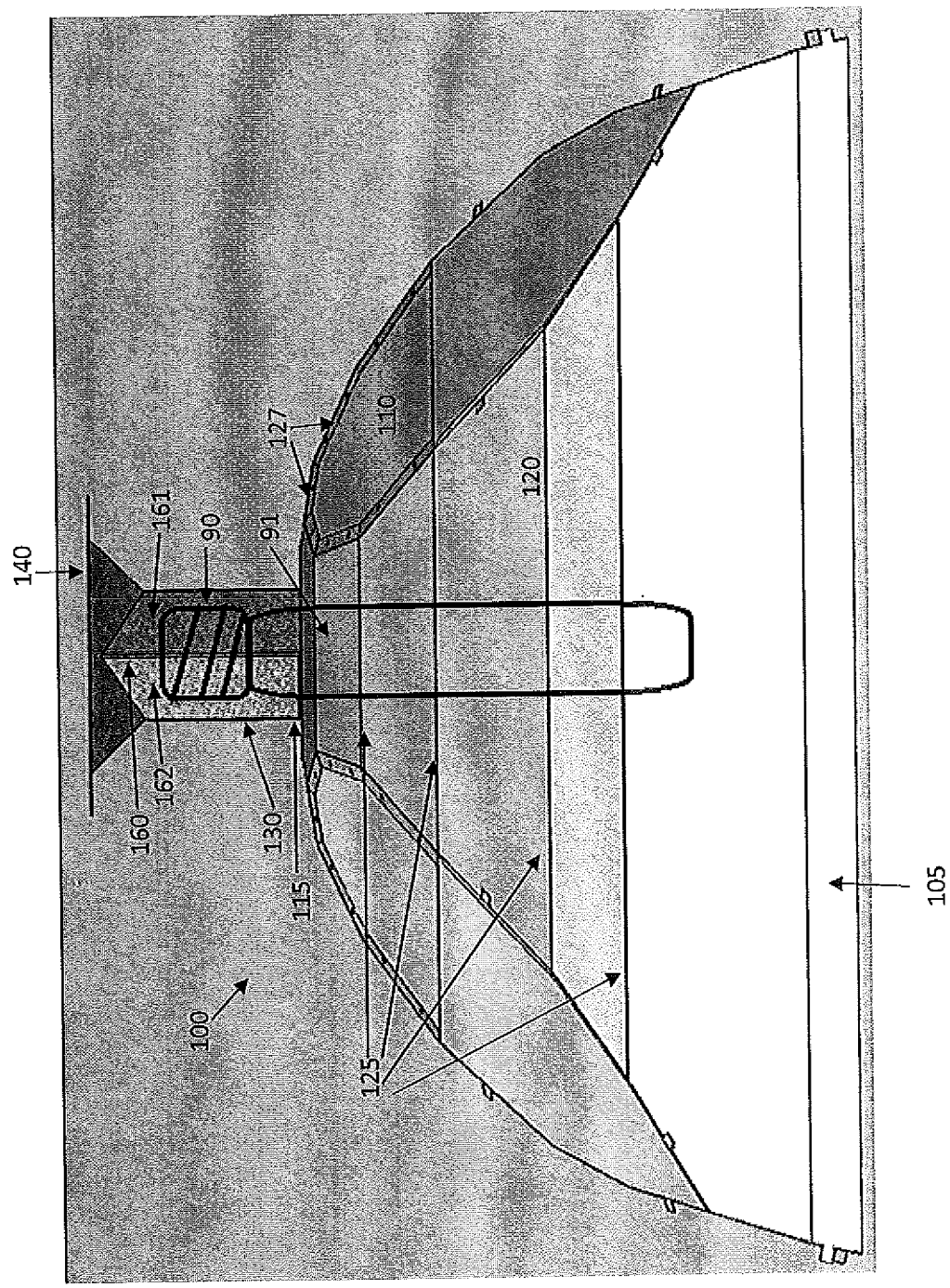
FIG. 6 is an end view of the reflector of FIG. 2.

FIG. 6 shows a front view of the reflector 100 and socket tower 130 attached together as shown in FIG. 2 and from the side in FIG. 5 further shown with the inclusion of a mock up of the lamp socket 90 and HID lamp 91. The upper tower flange 140 may be of any configuration that allows for positive securing and attachment to the housing 200. As shown the upper tower flange 140 is square and flat matching the perimeter of the top hole 280 shown in FIG. 3 thereby providing easy attachment. The socket tower 130 is of adequate height so as to provide space within for the lamp socket 90, including enough space to allow the HID lamp 91 to fittingly insert partially within the tower 130 at its threaded end, thereby sealing the HID lamp 91 to the internal reflector 100 at the reflector aperture 115. In the preferred embodiment, the aperture 115 is of diameter matching that of the desired HID lamp 91, such that installing the HID lamp 91 plugs the aperture 115. Having the HID lamp 91 inset within the tower 90 reduces the overall profile height of the total fixture, allowing for application of the fixture in low ceiling growing environments. Also of important note, the socket end of the HID lamp 91 produces minimal amounts of usable light, so partially insetting the HID lamp 91 within the socket tower 130 and the reflector 100 does not measurably decrease the performance of lumen output at the plant canopy, but it does provide versatility in what type of HID lamp 91 may be installed while maintaining a low profile.

Figure 6A:
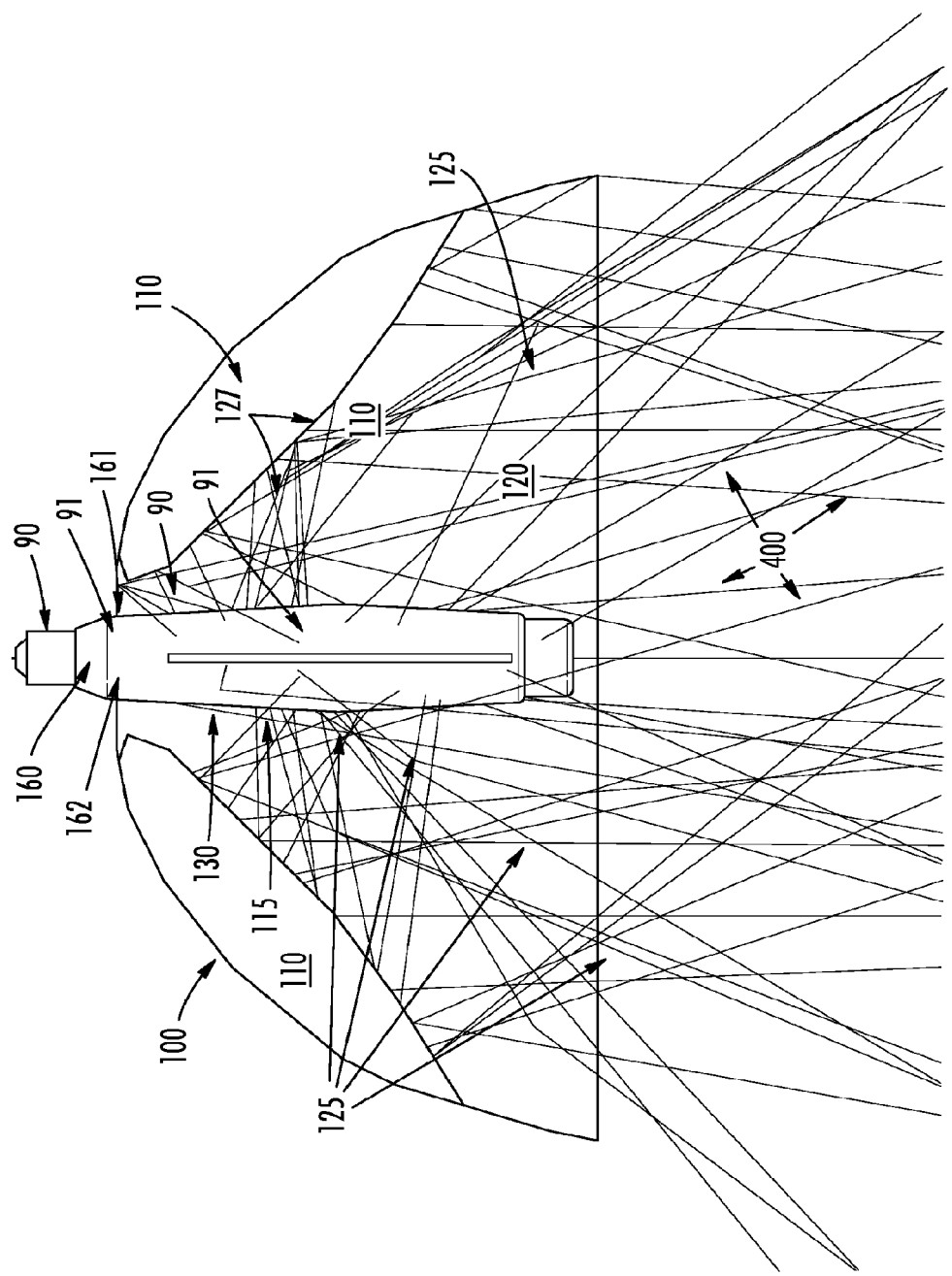
FIG. 6A is a cutaway side view of the reflector of FIG. 2 showing how light projects from the lamp.
Figure 6B:
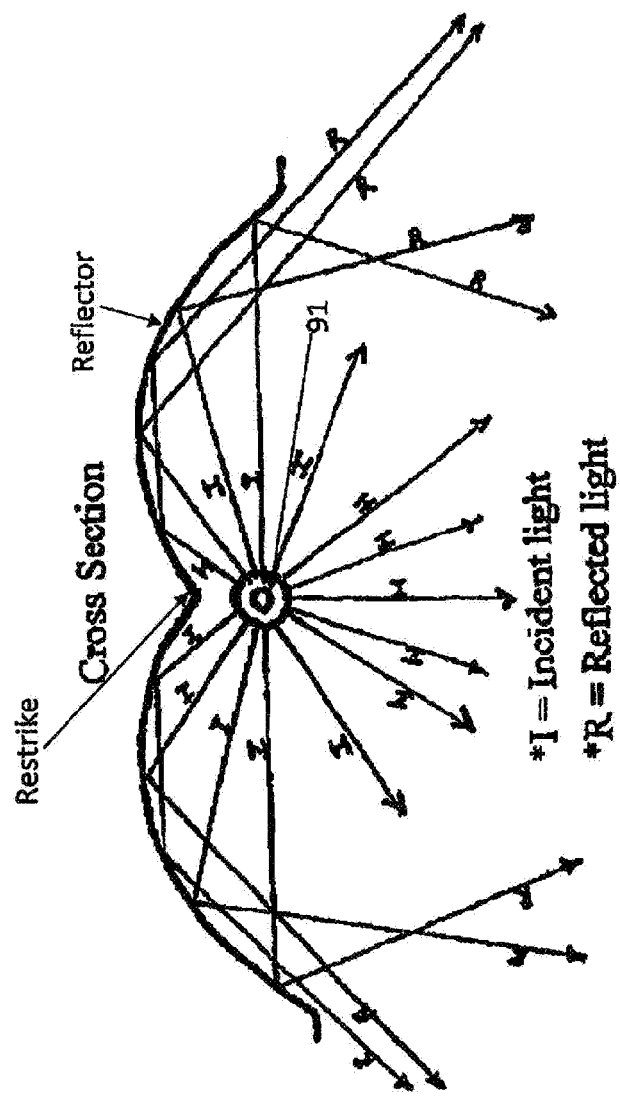
FIG. 6B is a cross section view of a reflector of the prior art.

FIGS. 6A (Vertical-Invention) and 6B (Horizontal-Prior Art) illustrates the differences of how the light projects from the lamp 91, and is then redirected per the reflector 100. The advantage of vertically disposing the lamp 91 shown as a cutaway in FIG. 6A is that almost all of the light 400 projecting from the lamp is reflected once down towards the plant canopy. There is no need for a spine or restrike in the reflector 100 to avoid scavenger rays which are a real problem in the horizontally disposed prior art, because of the relative location of the lamp 91 to the reflector 100, in relation to the plant canopy below. Looking at the prior art as illustrated by Cronk in U.S. Pat. No. 6,783,263 in FIG. 6B, with the lamp 91 horizontally disposed to the plant canopy, the reflector being located directly above representative of the standard indoor gardening configuration. As shown in FIG. 6B, the incident light projects 360 degrees away from the long axis of the lamp, with about half projecting directly towards the plant canopy below, and the other half directly into the reflector. The reflector must reflect half of the light at least once, and much of the incident light two and three times before it is headed towards the plant canopy, all while avoiding reflecting any light back into the lamp, which is directly in the way. Each reflection creates heat, and parasitically reduces lumens at the plant canopy. Also of importance, due to part of the light coming directly from the axis of the lamp, with the remainder being reflected, hot spots and cold spots plague horizontally disposed lamp reflectors, and much effort is spent designing around this hot spot cold spot short coming, but never to a complete success. The restrike at the spine or centerline as shown in FIG. 6B is necessary in the horizontally disposed lamp reflector to prevent premature failure of the lamp, because light that gets reflected back into the lamp causes excessive heat and material breakdown. This restrike as shown in FIG. 6B, by its reflective and angular nature encourages hot spots and multiple directional reflections of light, which both are contrary to a good performing reflector. Simply put, the HID lamp is best disposed vertically when used to grow plants, performance is enhanced, economic life is increased, and the problems associated with horizontally disposing the lamp are overcome by vertically disposing the lamp over the plant canopy.

The housing 200 as shown in FIGS. 1, 3,4, and 7, benefits from hanger tabs 50 that facilitate suspending the housing 200, and are located close to where the socket tower 130 fixates to the housing 200. The socket tower 130 fixates at the approximate center of the housing 200, and in the preferred embodiment, fixates around the top hole perimeter 285 of a top hole 280 located directly between the inlet duct 210 and exhaust duct 220 shown in FIG. 3 where the housing 200 is shown without the socket tower 130.

As shown in FIG. 7, the isolation chamber 300 is shown as within the housing 200 and around the exterior of the reflector 100. There are many configuration and shapes available for the socket tower 130, as it may be round, cylindrical, or have differently angled leading edges 160.

As shown in FIGS. 1 and 3, the preferred air cooled embodiment has the housing 200 with a lower lip 230 that facilitates a structure to sealingly engage a glass sheet 30 that is shown in FIG. 8 such that the interior of the reflector 100 and lamp is sealed from both the growing environment and the isolation chamber 300. In other embodiments, the reflector 100 lower edge 105 shown in FIG. 5 may provide structure to sealingly engage the glass sheet 30 such that the interior of the reflector 100 and lamp are sealed from the growing environment and isolation chamber 300.

As shown in FIGS. 7 and 8 the glass retention frame 70 removably attaches by fastening tabs 260, hinge hook 250 and mid tab 265, thereby locating the glass sheet 30 to seal the otherwise open bottom of the housing 200, or in other embodiments, the glass sheet 30 seals against the reflector 100. The fastening tabs 260 as shown in FIGS. 3, 4, 7, 8 and 9 comprise fastenably mating tabs on the frame 70 and lower edge of the housing 200. The hinge hook 250 is a double hook made entirely formed of sheet metal and enables the retention frame 70 to swing down and hang when changing a lamp, and swing back to seal the reflector/lamp area away from the growing environment. The hinge hook 250 is unique, in that it also facilitates an easy to open and close hinge, while at the same time, with a little user lift, the entire frame 70 and glass sheet 30 disengage from the housing for cleaning or maintenance.

In the preferred air cooled embodiment one unique feature of Applicant's fixture is the totally sealed interior of the reflector 100 and lamp 91, which means the interior of the reflector 100 and the heat generated from the lamp 91 is isolated from all moving and still air as within the housing 200, while also being isolated from the environment of the growing plants. Most if not all air cooled lamp fixtures in the prior art that benefit from forced air cooling have the cooling air moving directly around the lamp that passes through the interior of the reflector and then exhausted. The lamp in the prior art is directly cooled by the forced air. For recent example see Craw et al. U.S. Pat. No. 7,175,309 teaches a lighting and ventilating apparatus wherein the fan draws air into and through a first aperture of the lamp housing, draws air around the lamp, and through a second aperture.

In the non-air cooled embodiment the fixture is again unique in that the totally sealed interior of the reflector 100 and lamp 91 are not in air communication with the interior of the housing 200 or the environment of the growing plants. Previous problems with overheating a horizontally disposed HID lamp resulting in failures as described previously herein are eliminated by the vertically disposed lamp 91.

As the vertically disposed lamp is not as susceptible to heat failure or 'drooping' which occurs when a horizontally disposed lamp is over heated, the sealed reflector 100 interior and lamp 91 are kept at high temperatures with minimal heat pollution to the external environment due to the air isolation chamber 300 between the reflector insert 100 and the housing 200, as defined by the socket tower 130.

For the non-air cooled embodiment, the air isolation chamber 300 facilitates the space for insulating the interior of the housing 200 from the heated exterior of the reflector 100, thereby reducing temperatures as measured at the housing 200 exterior and shielding the environment for the growing plants from heat pollution. Heat energy convectively transfers through the reflector 100, but there is no air communication between the interior of the reflector 100 and the interior of the housing 200, or as between the interior of the reflector 100 and the environment of the growing plants.

For the air cooled embodiment, the air isolation chamber 300 facilitates the space for the cooling air to move through and between the reflector 100 exterior and housing 200 interior, through forced air cooling by fan or other means such that cooling air traverses between the inlet duct 210 and exhaust duct 220, cooling the interior of the housing 200, the exterior of the reflector 100, and reducing the temperature of the socket tower 130, and convectively cooling the reflector 100 thereby maintaining proper operating temperatures for the HID lamp 91 and the reflector 100 interior.

Also of benefit, the sealed reflector 100 interior negates the requirements of filtering the cooling air because the cooling air does not contact or move through the lamp area or the interior of the glass sheet 30. Dust, particulates, or other commonly air carried impurities never are introduced to onto the lamp or the glass sheet 30 interior, thereby reducing maintenance while increasing performance, as a dirty lamp reduces economic life span, as does a dirty glass sheet 30.

Figure 10:
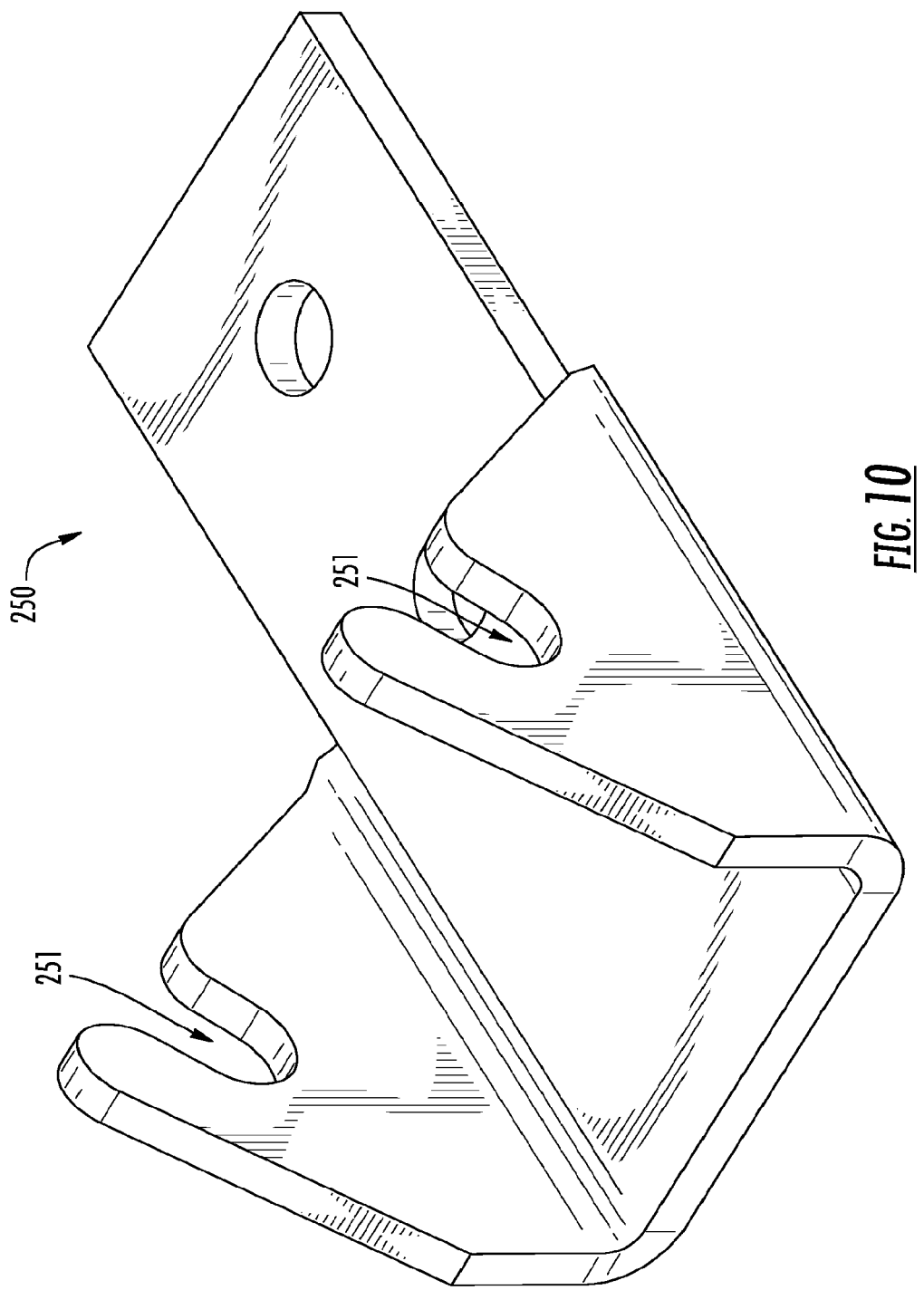
FIG. 10 is a perspective view of the hinge hook with two prongs shown in earlier FIGs.
Figure 11:
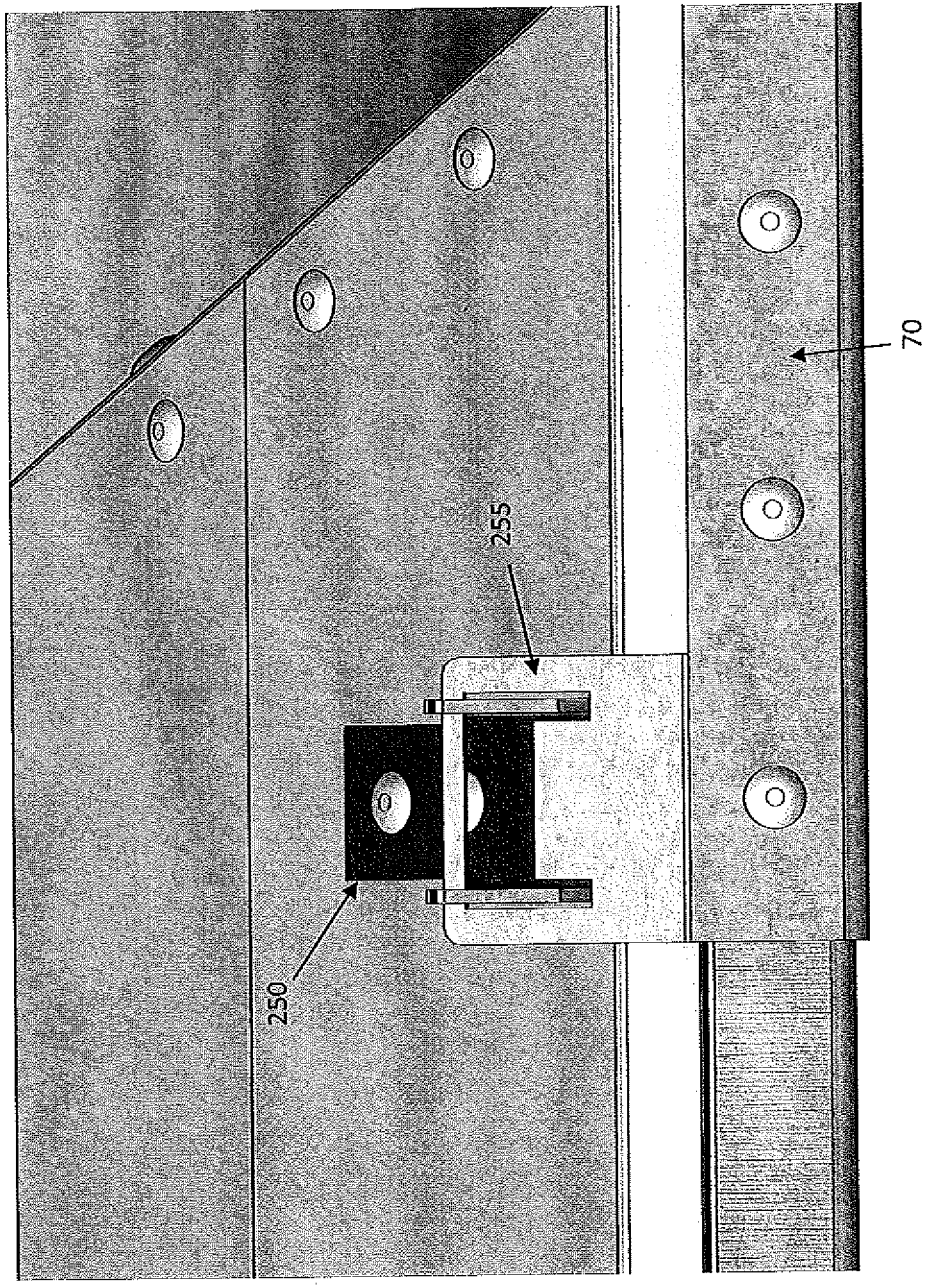
FIG. 11 is a perspective view of the hinge hook with two prongs removably engaged with a hinge slot, fixated on a retention frame.

The hinge hook 250 and hinge slot 255 shown first in FIG. 1 attached to the housing 200 and retention frame 70 respectively, are better shown in FIG. 11, and in close up perspective view of the hinge hook 250 in FIG. 10. The two prong 251 of the hinge hook 250 provide balanced cooperative interconnect with the hinge slot 255, which provides securement of the retention frame 70, such that one hinge hook 250 on each end of the housing 200 facilitates the removable engagement of the retention frame 70 to the housing 200. Because of the double prongs 251, each connection point at the hinge slot 255 is self-balanced providing for the option of dropping the retention frame 70 down to hang from the hinge hooks 250, while having the further option of lifting the retention frame 70 thereby disengaging the hinge hook 250 and specifically the hinge prong 251 from the hinge slot 255. The hinge slot 255 is configured and arranged to match the radius and size of the hinge hook 250.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims.

DESCRIPTION OF THE RELATED ART

Indoor gardens, green houses, hydroponic growing systems, and grow rooms all require artificial light to grow plants. Currently, the most common artificial grow-light source is HID (High Intensity Discharge) lamps constructed from high pressure sodium and metal halide technologies. The HID lamps have been a mainstay in the indoor gardening market for over twenty years. For various reasons discussed herein, the industry's standard mounting method involves the lamp being horizontally disposed relative to the plants, and a reflector located above the lamp to project light down at the plants.

Forced air cooling of HID lighting systems became popular over the past ten years, and many of the latest grow light systems benefit from a glass sheet that seals the heated air away from the plants while cooling air is forced by fan into the housing, through the reflector, around the HID lamp and surrounding lamp chamber, and exhausted outside of the plant growing area. As the HID lamp is horizontally disposed, the cooling air ducts are positioned generally at either end, thereby centering the lamp within the cooling air stream to facilitate the removal or heated air.

Problems with the configuration of having the HID lamp horizontally disposed relative to the plants is that the reflector must be carefully configured to avoid projecting scavenger rays back into the lamp, which cause premature failure of the lamp and decrease performance. As the lamp produces light radially along the long axis away from the HID filament, more than half of the light produced projects in the opposite direction away from the plants, thus requiring a plurality of directional reflections to redirect and project the light in the desired direction, towards the plants. Each directional reflection causes parasitic losses and generates undesirable heat. Further, hot spots and cold spots at the plant canopy caused from the bends of the reflector, as required by the plurality of directional reflections, negatively impact plant growth and development. The horizontal location of the HID lamp also prevents swapping one type of a lamp for another as each reflector is designed for a particular lamp, installed at a specific location. If a user wants to change to a different type of lamp, the socket location must be adjusted, or in some cases, the reflector design is specific to a particular lamp, and the install of a different type of lamp is not feasible.

The advantage of locating the HID lamp horizontal to the plants is that the reflector can be shallow, having a relatively low profile, enabling install over the plants in confined spaces like grow tents or low ceiling green houses. As taught by Stragnola in U.S. Pat. No. 6,042,250 having a low profile height, the bulb/lamp is positioned at the focal point of the reflector hood perpendicularly downward from the flat plane of the center panel, in other words, the bulb/lamp is located horizontally relative to the plant canopy, which is horizontal to the flat plane, with the hood reflecting downward the light that emits radially upward from the bulb/lamp. Stragnola discusses in the specification that the mounting bracket can provide vertical or horizontal positioning to accommodate different sizes and shapes of bulbs/lamps, but does not teach locating the bulb/lamp vertical relative to the plant canopy, as confirmed by one aperture in the side of the reflector hood, not centered through the top as required by a vertically disposed lamp system.

Another prior art example of horizontally disposing the lamp relative to the plants is Cronk U.S. Pat. No. 6,783,263. In Cronk, the horizontally disposed lamp includes a reflector above the lamp to reflect light initially headed away from the plants, a restrike or spine located above the axis of the lamp to prevent scavenger rays, and a necessary heat shield located below the lamp to prevent hot spots at the plant canopy. There was no implied or specific teaching in Cronk to tip the lamp on its end and vertically dispose the lamp, as the projected light would impact the side of the plant, not the preferred top canopy.

The ideal disposing of the HID lamp is vertical to the plants, not horizontal. Locating the HID lamp vertically prevents light from being initially projected away from the plants, allows the user to change one lamp for another type without changing socket location, negates the need for reflector angles or restrikes to prevent scavenger rays, and allows for a single directional reflection to project light towards the plants, rather than a plurality of parasitic directional reflections. Also of importance, a vertically disposed HID lamp convectively cools better than horizontally disposed, and for many lamps, burning vertically increases the life of the lamp while improving efficient lumen output. However, locating the HID lamp vertical relative to the plants in the indoor gardening environment poses two primary challenges: First, almost all of the light produced by the lamp radially emits from the long axis, and when vertically disposed over the plants, not much light projects down unless there is a 360 degree reflector, so a continuous reflector without holes or cooling ducts is needed in order to advantage the vertically disposed lamp; Second, the profile height of the currently available vertically disposed HID lighting systems are too tall or require too high of mounting location over the plants to be used in indoor gardening environments.

Further challenges of vertically disposing the HID lamp involve cooling the housing to prevent heat pollution into the growing environment, as most of the currently available reflectors (horizontally disposed lamp) locate the lamp directly within the cooling air stream horizontally, thereby maximizing the cooling of the lamp and housing without increasing the height or profile of the lighting system. For obvious reasons, the vertically disposed lamp system cannot be centered in the cooling air stream because of the lamp's orientation in the housing which would require a duct from above, and duct below, or through the glass sheet. Further, adding a duct to the top would increase the profile or fixture height aggravating the profile height problem, negating use in most indoor gardening environments.

The horizontally disposed HID lamp fixtures avoid the challenges involved with disposing the lamp vertically, and thus why the horizontally disposed lamp fixture technology is currently the standard in the indoor gardening industry. However, the lighting output on plant canopy target for the horizontally disposed HID lamp fixtures are at the physical limits of the horizontal configuration, with minor improvements being made in reflector materials, reflector design, and power to lamp management. The major improvements in HID lamp fixture efficiencies remain available with vertically disposing the lamp, however, the challenges as discussed herein concerning the fixture design have prevented fixtures having the HID lamp the vertically disposed from being a viable option for the indoor garden industry.

What is claimed is:

1. A horticulture light fixture comprising:
   a housing having an interior, an exterior, a forced air cooling inlet duct, a forced air cooling outlet duct, and a lower lip defining an opening directed downward toward plants to be grown therebelow, said inlet duct and said outlet duct each having outward extending material sized and adapted to be connectable to forced air ducting;
   a light socket surrounding structure having a lower flange and an upper flange, said upper flange affixed to said housing, said light socket adapted to receive a lamp capable of producing electromagnetic energy at wavelengths conducive to growing plants;
   a reflector having an interior side, an exterior side, and an aperture, said lower flange affixed around the perimeter of said aperture such that an isolation chamber is defined between the exterior side of the reflector and the interior of said housing, said isolation chamber being in air flow communication with said inlet duct and outlet duct; and
   a light socket disposed within said light socket surrounding structure such that said lamp removably engaged within said light socket extends substantially through said aperture to said interior side of said reflector and said isolation chamber substantially prevents air flowing between said inlet duct and said outlet duct from commingling with air around said lamp.

2. The fixture in claim 1 further comprising a glass sheet compressively held against said lower lip such that said lamp and said interior side of said reflector defines a lamp chamber sealed from said plants to be grown therebelow.

3. The fixture in claim 1 wherein said light socket is positioned within said reflector to orient said lamp in a vertical orientation, with one end of said lamp engaged with said socket and the other end extending vertically downward toward said lower lip and said plants to be grown therebelow.

4. The fixture in claim 1 wherein said lamp comprises a high intensity discharge horticulture lamp.

5. The fixture of claim 1 wherein said inlet and outlet ducts are oriented substantially opposite one another such that air flow between said inlet duct and said outlet duct flows substantially horizontally in relation to said lower lip and said plants to be grown therebelow.

6. The fixture of claim 2 further comprising at least one hinge hook affixed to said housing and at least one correspondingly mating hinge slot member securably attached to said glass sheet, each of said hinge hook and correspondingly mating hinge slot member allowing for said glass sheet to be rotatably opened away from a closed position about said lower lip and then lifted off of said hinge hook so as to remove said glass sheet from said fixture.

7. A method of cooling a horticulture light fixture comprising:
   (a) providing a horticulture light fixture having a housing with an interior, an exterior, a forced air cooling inlet duct, a forced air cooling outlet duct, and a lower lip defining an opening directed downward toward plants to be grown therebelow, said inlet duct and said outlet duct each having outward extending material sized and adapted to be connectable to forced air ducting;
   a light socket surrounding structure having a lower flange and an upper flange, said upper flange affixed to said housing, said light socket adapted to receive a lamp capable of producing electromagnetic energy at wavelengths conducive to growing plants;
   a reflector having an interior side, an exterior side, and an aperture, said lower flange affixed around the perimeter of said aperture such that an isolation chamber is defined between the exterior side of the reflector and the interior of said housing, said isolation chamber being in air flow communication with said inlet duct and outlet duct; and
   a light socket disposed within said light socket surrounding structure such that said lamp removably engaged within said light socket extends substantially through said aperture to said interior side of said reflector and said isolation chamber substantially prevents air flowing between said inlet duct and said outlet duct from commingling with air around said lamp;
   (b) installing said lamp into said light socket and energizing said lamps; and
   (c) flowing air between said inlet duct and said outlet duct.

8. The method of claim 7 wherein said fixture further comprises a glass sheet compressively held against said lower lip such that said lamp and said interior side of said reflector defines a lamp chamber sealed from said plants to be grown therebelow.

9. The method of claim 7 wherein said fixture further comprises a light socket positioned within said reflector to orient said lamp in a vertical orientation, with one end of said lamp engaged with said socket and the other end extending vertically downward toward said lower lip and said plants to be grown therebelow.

10. The method of claim 7 wherein said fixture further comprises a high intensity discharge horticulture lamp.

11. The method of claim 7 wherein said fixture further comprises inlet and outlet ducts oriented substantially opposite one another such that air flow between said inlet duct and said outlet duct flows substantially horizontally in relation to said lower lip and said plants to be grown therebelow.

12. The method of claim 8 wherein said fixture further comprises at least one hinge hook affixed to said housing and at least one correspondingly mating hinge slot member securably attached to said glass sheet, each of said hinge hook and correspondingly mating hinge slot member allowing for said glass sheet to be rotatably opened away from a closed position about said lower lip and then lifted off of said hinge hook so as to remove said glass sheet from said fixture.

13. The method of claim 7 wherein said air flowing between said inlet and outlet ducts comprises unfiltered cooling air, since said cooling air does not contact said lamp or reflector interior area.

14. A horticulture light fixture comprising:
a downwardly directed plant growing light fixture housing having an interior, an exterior, a forced air cooling inlet duct for receiving cooling air, and a forced air cooling outlet duct for exhausting cooling air, and a lower lip defining an opening directed downward and operable to reflect light downward toward plants to be grown therebelow, said inlet duct and said outlet duct each having outward extending material sized and adapted to be connectable to forced air ducting:

a light socket adapted to receive a plant growing lamp affixed to said housing, said lamp capable of producing electromagnetic energy at wavelengths conducive to growing plants;
a reflector having an interior side, an exterior side, and an aperture, said light socket extending through said aperture and constructed such that a chamber is defined between the exterior side of the reflector and the interior of said housing; said chamber being in air flow communication with said inlet duct and outlet duct; and
said light socket oriented such that said lamp removably engaged within said light socket extends substantially through said aperture to said interior side of said reflector and said chamber substantially prevents air flowing between said inlet duct and said outlet from commingling with air around said lamp.

15. The fixture in claim 14 further comprising a glass sheet compressively held against said lower lip such that said lamp and said interior side of said reflector defines a lamp chamber sealed from said plants to be grown therebelow.

16. The fixture is claim 14 wherein said light socket is positioned within said reflector to orient said lamp in vertical orientation, with one end of said lamp engaged with said socket and the other end extending vertically downward toward said lower lip and said plants to be grown therebelow.

17. The fixture in claim 14 wherein said lamp comprises a highly intensity discharge horticulture lamp.

18. The fixture of claim 14 wherein said inlet and outlet ducts are oriented substantially opposite one another such that air flow between said inlet duct and said outlet duct flows substantially horizontally in relation to said lower lip and said plants to be grown therebelow.

19. The fixture of claim 15 further comprising at least one hinge hook affixed to said housing and at least one correspondingly mating hinge slot member securably attached to said glass sheet, each of said hinge hook and correspondingly mating hinge slot member allowing for said glass sheet to be rotatably opened away from a closed position and said lower lip and then lifted off of said hinge hook so as to remove said glass sheet from said fixture.

\* \* \* \* \*